United States Patent
Nagasawa

(10) Patent No.: US 9,032,241 B2
(45) Date of Patent: May 12, 2015

(54) SERVER, SERVER SYSTEM, AND METHOD FOR CONTROLLING RECOVERY FROM A FAILURE

(75) Inventor: Tomoyuki Nagasawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 278 days.

(21) Appl. No.: 13/564,052

(22) Filed: Aug. 1, 2012

(65) Prior Publication Data

US 2013/0036324 A1 Feb. 7, 2013

(30) Foreign Application Priority Data

Aug. 4, 2011 (JP) ................................ 2011-171028

(51) Int. Cl.
*G06F 11/00* (2006.01)
*H04L 29/08* (2006.01)
*G06F 11/14* (2006.01)
*G06F 11/20* (2006.01)

(52) U.S. Cl.
CPC ............ *H04L 67/32* (2013.01); *G06F 11/1484* (2013.01); *G06F 11/2038* (2013.01); *G06F 11/2046* (2013.01); *G06F 11/2048* (2013.01); *G06F 11/2097* (2013.01)

(58) Field of Classification Search
USPC .......................................... 714/4.1, 4.11, 4.2
See application file for complete search history.

(56) References Cited

U.S. PATENT DOCUMENTS

2011/0154332 A1   6/2011 Shirae et al.
2011/0321041 A1*  12/2011 Bhat et al. ......................... 718/1

FOREIGN PATENT DOCUMENTS

| JP | 2008-276320 | 11/2008 |
|---|---|---|
| JP | 2010-3022 | 1/2010 |
| JP | 2010-211819 | 9/2010 |
| JP | 2011-134010 | 7/2011 |

OTHER PUBLICATIONS

E. Kohler, et al., "Datagram Congestion Control Protocol (DCCP)", Network Working Group, RFC4340, Mar. 2006, pp. 1-115.
David C. Plummer, "An Ethernet Address Resolution Protocol—or—Converting Network Protocol Addresses to 48.bit Ethernet Address for Transmission on Ethernet Hardware", Network Working Group, RFC 826, Nov. 1982, pp. 1-8.
S. Cheshire, Network Working Group, "IPv4 Address Conflict Detection", Network Working Group, RFC 5227, Jul. 2008, pp. 1-19.
A. Sollaud, "G.729.1 RTP Payload Format Update: Discontinuous Transmission (DTX) Support", Network Working Group, RFC 5459, Jan. 2009, pp. 1-7.
T. Narten, "Neighbor Discovery for IP Version 6 (IPv6)", Network Working Group, RFC 2461, Dec. 1998, pp. 1-83.
Japanese Office Action issued Feb. 3, 2015 in corresponding Japanese Patent Application No. 2011-171028.

* cited by examiner

*Primary Examiner* — Sarai Butler
(74) *Attorney, Agent, or Firm* — Staas & Halsey LLP

(57) ABSTRACT

A server includes a monitoring unit that monitors operation states of one or more physical servers in use on which same applications operate, a synchronization unit that synchronizes the data between one of the physical servers in use and one of virtual servers in a standby physical server, and a switching unit that, when the monitoring unit has detected that a failure has occurred in the operation of one of the physical servers in use, that operates a second application of the same applications while referring to a piece of the data on the one of the virtual servers synchronized by the synchronization unit with the data on the one of the physical servers in use, and that switches operation from the one of the virtual servers to the standby physical server.

20 Claims, 20 Drawing Sheets

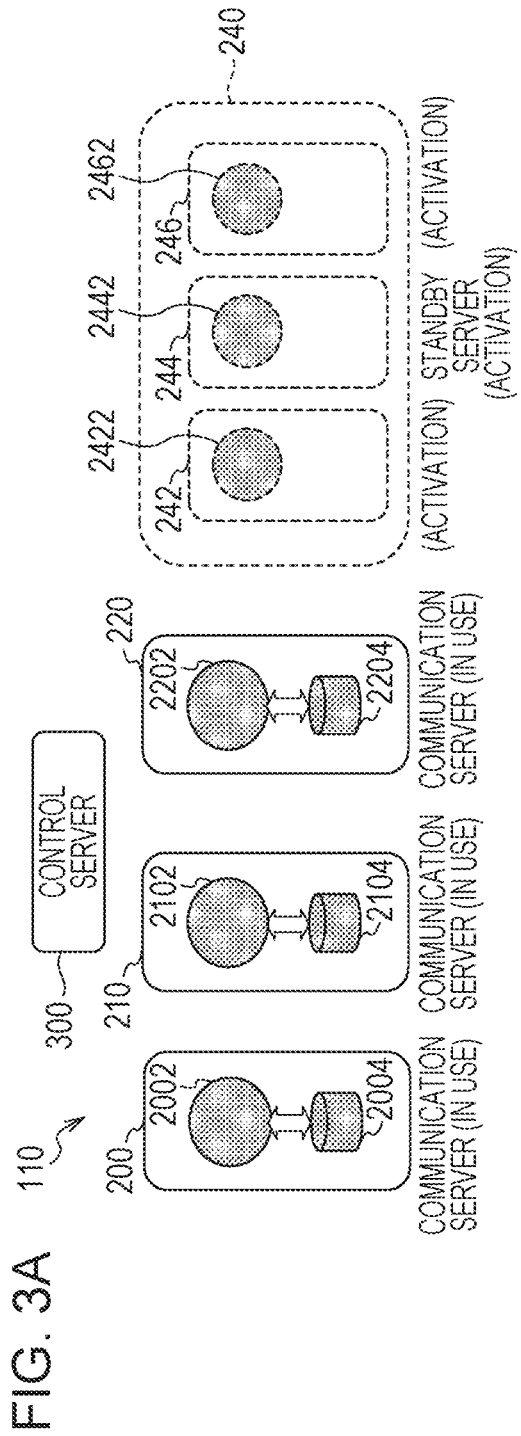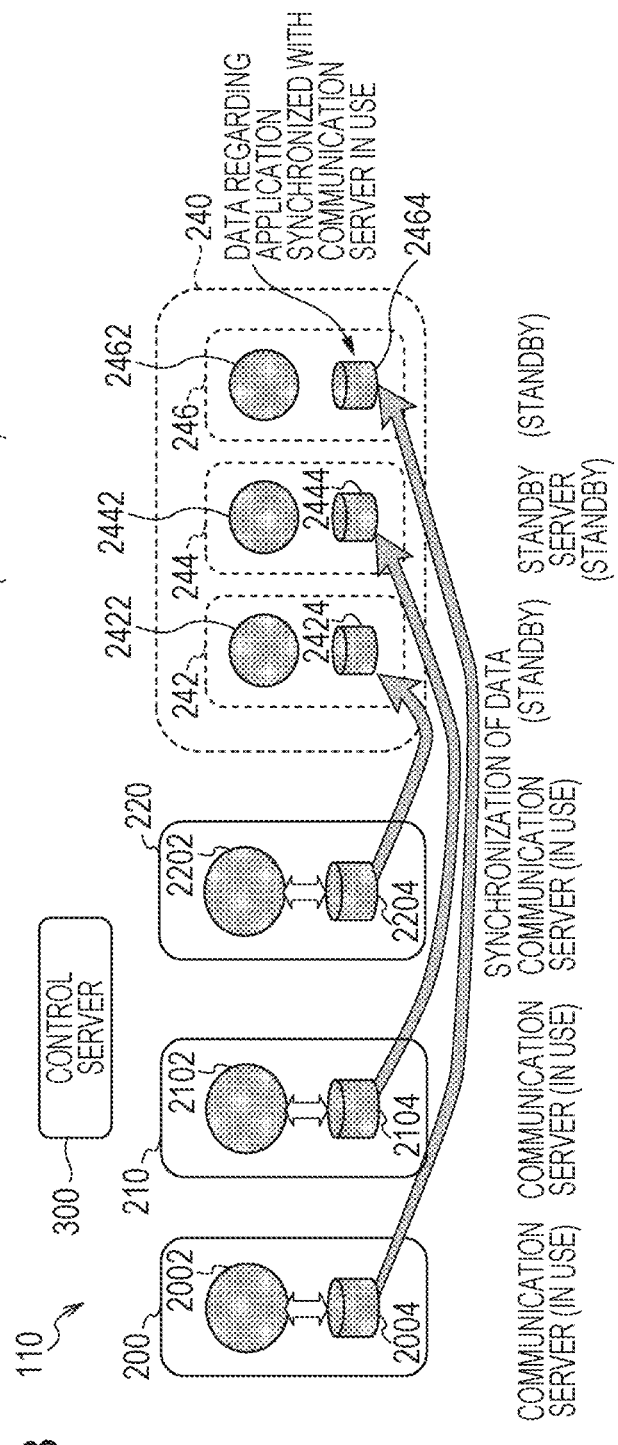

FIG. 4

| LS Age | LS Type |
|---|---|
| Link State ID ||
| Advertising Router ||
| LS Sequence Number ||
| LS Checksum | Length |

The LSA Header
(RFC4340)

FIG. 5

| Hardware Type (HTYPE) || Protocol Type (PTYPE) |
|---|---|---|
| Hardware Address Length (HLEN) | Protocol Address Length (PLEN) | |
| Sender hardware address (SHA) |||
| Sender Hardware Address (SHA) [Cont'd] || Sender Protocol Address (SPA) |
| Sender Protocol Address (SPA) [Cont'd] || Target Hardware Address (THA) |
| Target Hardware Address (THA) [Cont'd] |||
| Target Protocol Address (TPA) |||

The ARP Header
(RFC826/RFC5227/RFC5459)

FIG. 6

| Type | Code | Checksum |
|---|---|---|
| R S O | Reserved | |
| Target Address | | |
| Options ••• | | |

The Neighbor Advertisement Message Format
(RFC2461, chapter 4.4)

FIG. 7

| Connection Type | Protocol Type |
|---|---|
| Connection Flags | |
| Connected Address A | |
| Connected Address B | |
| Connected Port A | Connected Port B |
| Connection State | |
| Optional Field ••• | |

FIG. 8

| Connection Type | Protocol Type | Connection Flags |
|---|---|---|
| Connected Address A ||| 
| Connected Address B ||| 
| Connected Port A | Connected Port B | Connection State |
| Optional Field ··· |||

FIG. 9

| NAT Type | Protocol Type |
|---|---|
| NAT Flags ||
| Local Address ||
| Global Address ||
| Remote Address ||
| Local Port | Global Port |
| Remote Port | Optional Field ··· |

FIG. 10

| NAT Type | Protocol Type | NAT Flags |
|---|---|---|
| Local Address ||||
| Global Address ||||
| Remote Address ||||
| Local Port | Global Port | Remote Port | Optional Field ··· |

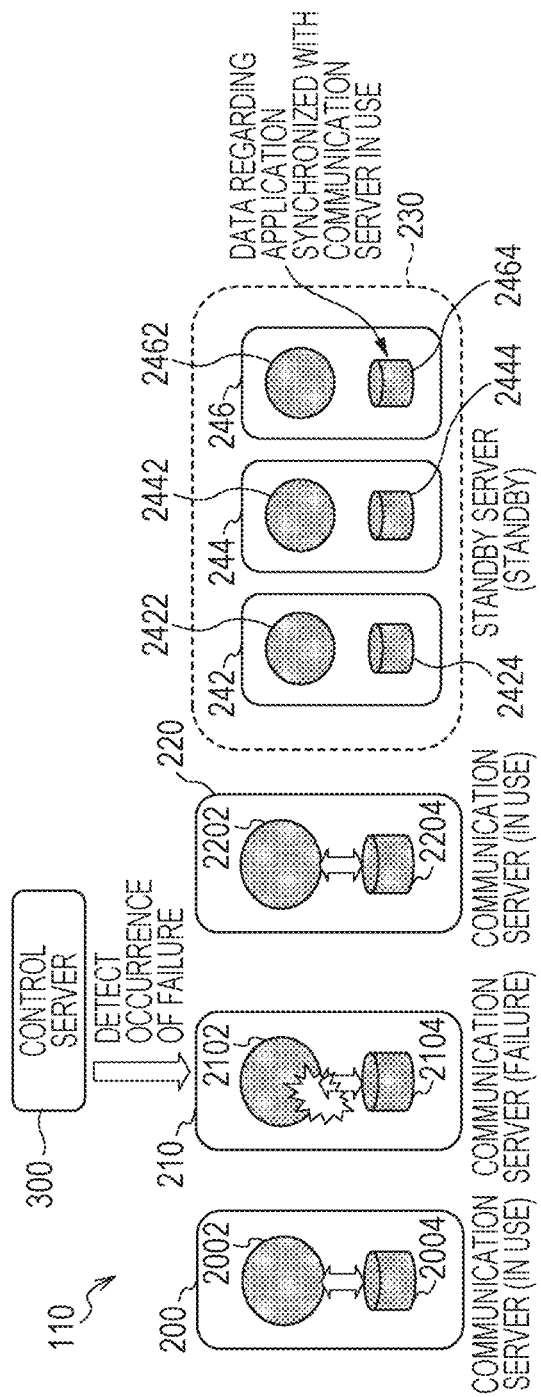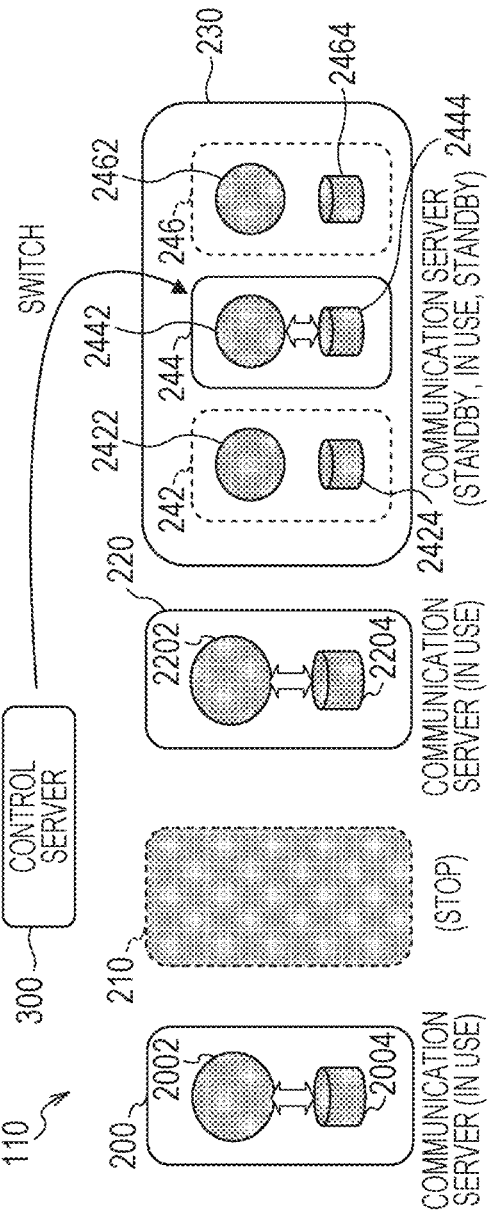

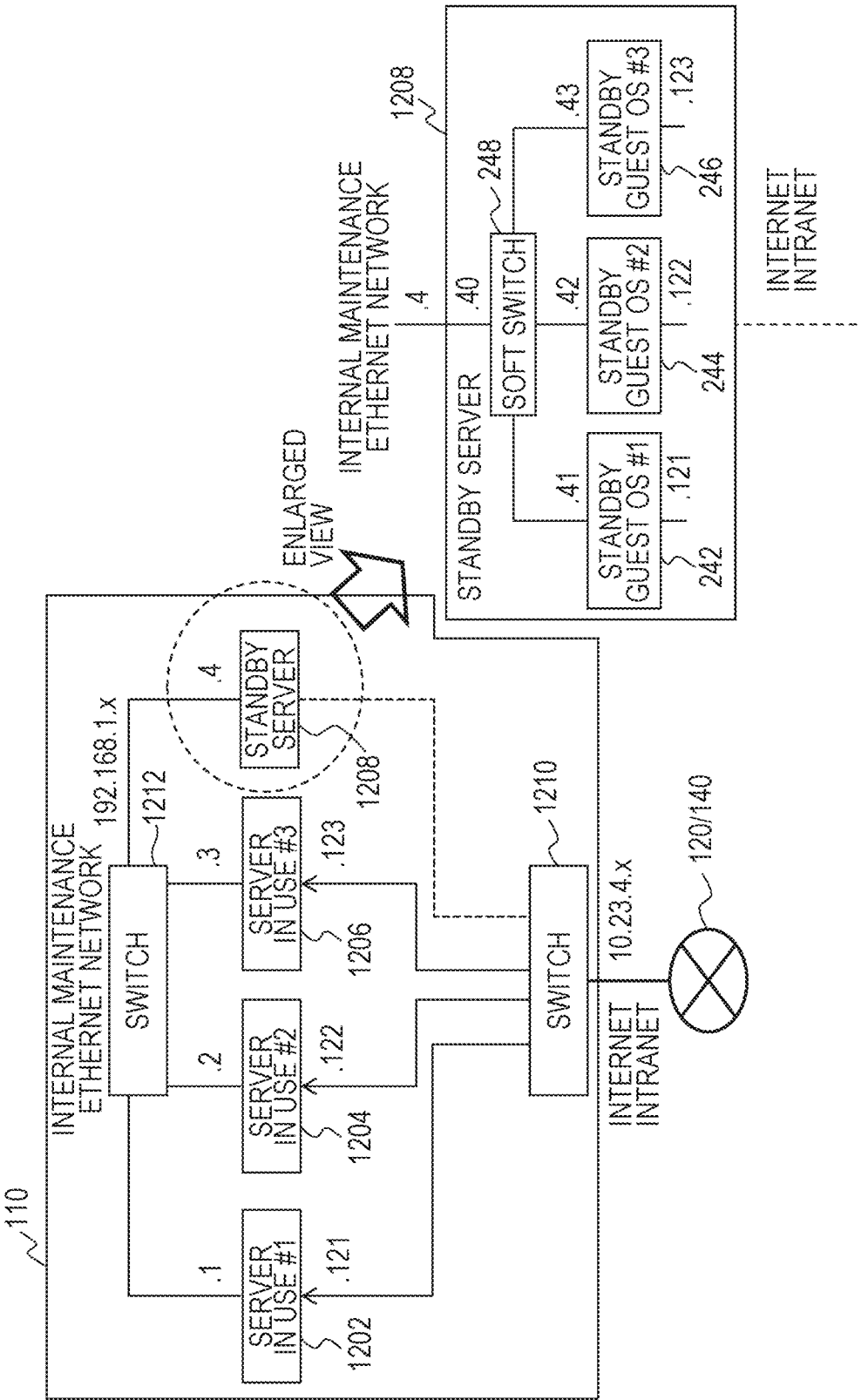

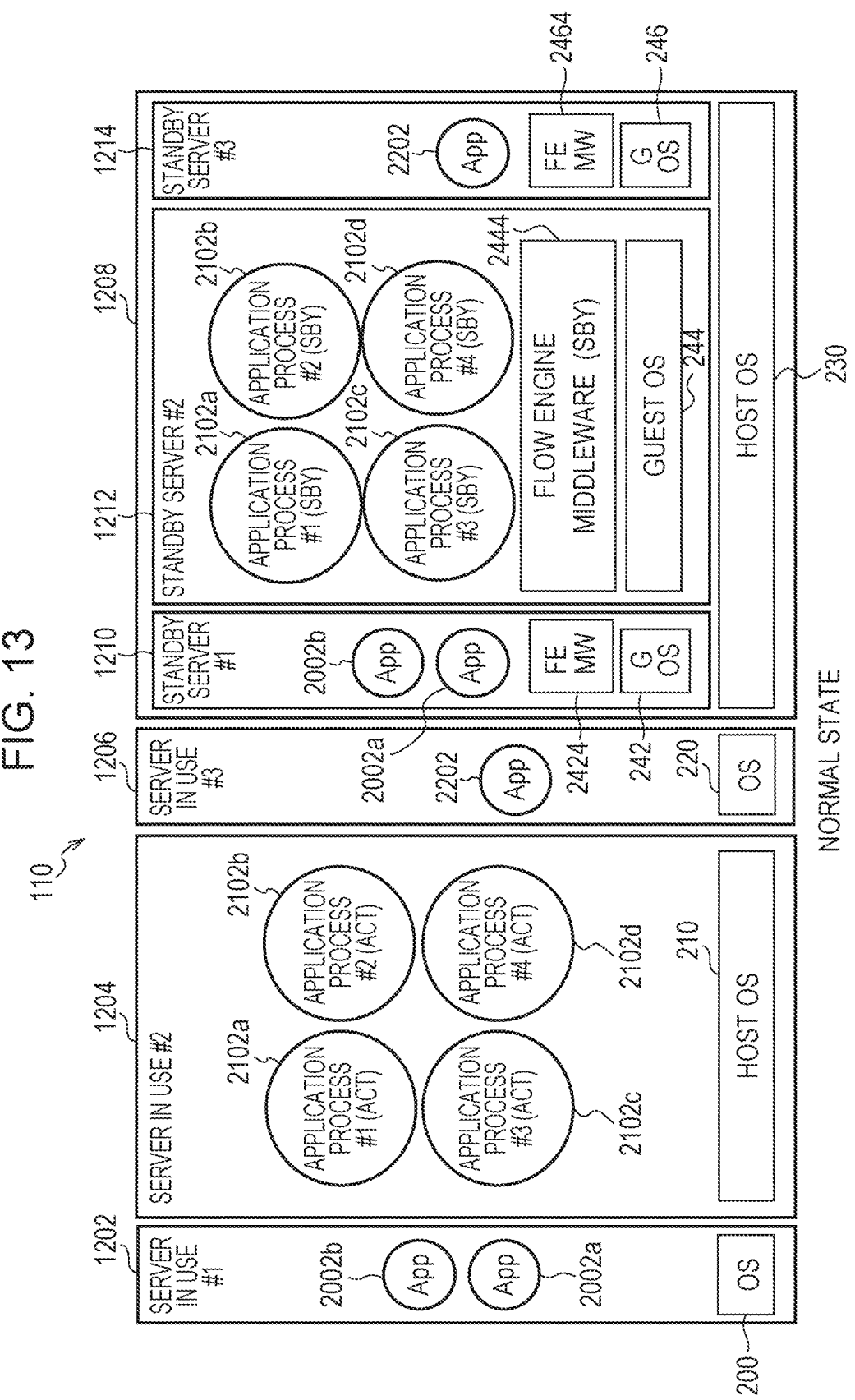

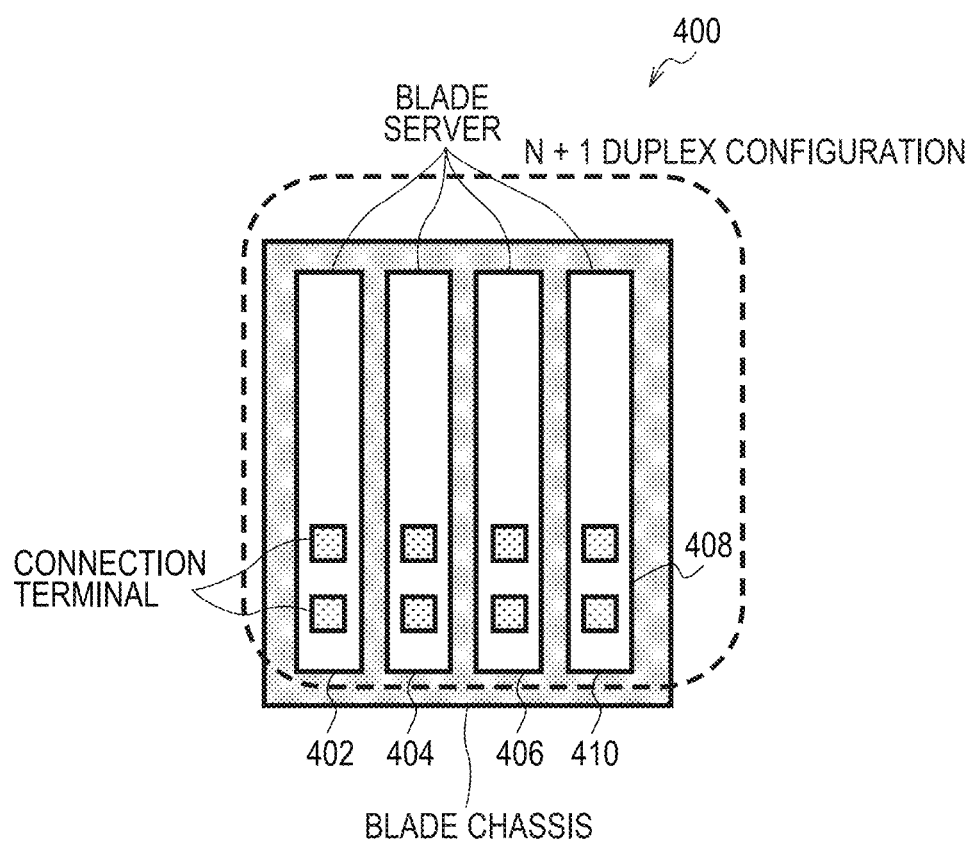

SERVER, SERVER SYSTEM, AND METHOD FOR CONTROLLING RECOVERY FROM A FAILURE

CROSS-REFERENCE TO RELATED APPLICATION

This application is based upon and claims the benefit of priority of the prior Japanese Patent Application No. 2011-171028, filed on Aug. 4, 2011, the entire contents of which are incorporated herein by reference.

FIELD

The embodiments discussed herein are related to a server system including a redundant configuration in which a plurality of servers are included and a redundant switching method for the servers.

BACKGROUND

Currently, apparatuses such as a security gateway, a load balancer, a network device operation control apparatus are configured by combining a plurality of servers. An apparatus configured by combining a plurality of servers typically has high reliability such as durability of service. Nowadays, corporate activity largely depends on machines, and a potential loss from a stop of a machine system is significant, which has prompted a call for high reliability. In particular, the popularization of the Internet and the emergence of new services such as a moving image service are increasing the traffic of the Internet, and apparatuses are expected to economically construct and operate a communication system at high speed that can execute high-speed processing and enable various services.

Among these apparatuses, apparatuses provided at positions that are supposed to offer smooth service, such as a data center and a carrier, especially a server system, might adopt a redundant configuration in which redundant apparatuses and servers are included in addition to apparatuses that are actually operated, in order to reduce a period of time for which communication stops during maintenance work or upon occurrence of a failure.

As one of methods for realizing a redundant configuration, a server system may have an N+1 redundant configuration, in which a standby server is prepared in addition to N servers in use. By adopting the N+1 redundant configuration, the reliability of the server system, especially the availability of the server system, can be improved.

For example, a blade system is known in which a plurality of central processing unit (CPU) blades are stored in a chassis, a virtual machine (VM) system realized by a virtual machine method is operated in each CPU blade, and a given server stands by as a redundant server, in order to achieve load leveling and avoid a stop of the system due to a failure. In such a system, by migrating a virtual system from a server in use to a redundant server when a failure or the like has occurred, smooth system operation can be realized.

In addition, a system is known in which, when a system operating in a certain CPU blade, that is, for example, a virtual system, is to be migrated to another CPU blade, the destination CPU blade is not limited to a given one and an optimal blade system can be selected while taking into consideration the characteristics of blades, the operation states of fans, power supplies, and the like, a failure occurrence condition, and the like. In such a system, a redundant blade does not have to be prepared in advance. Furthermore, by digitizing the system operation condition of each CPU blade and configuring the system such that a CPU blade including the same or better operation condition as or than an original CPU blade is selected when a failure has occurred in the original CPU blade, it is possible to reduce the time taken to complete the migration after the occurrence of the failure.

In addition, a system is known in which servers in use configured by a plurality of physical servers on which a plurality of virtual machines realized by the virtual machine method can operate and a single standby server on which virtual machines operate are included, and when a failure has occurred in one of the physical servers in use, an operating system (OS) that has operated in the physical server is activated as a standby virtual server, or when a failure has occurred in one of the physical servers on which one of the virtual machines operates, a virtual OS of the virtual machine is activated as a standby virtual server. In a process for recovering from a failure executed by this system, when a failure event has occurred in one of the servers in use, an activation disk used by the server in which the failure event has occurred is assigned to the standby server, and the power of the standby server is turned on.

In addition, a method for updating a file is known that, in a virtual server condition in which a plurality of VM systems operate in a single physical server as servers and duplex operation is realized by one of blades that operates as a server in use and another blade that operates as a standby server, does not affect another virtual server operating on the same physical server when the operation is switched from one blade to another blade.

In general, when a plurality of virtual servers have been constructed on a physical server, all the virtual servers operating on the physical server stop if a failure occurs in the physical server, and therefore there has been a problem in that it is difficult to achieve high reliability for the system. On the other hand, when a plurality of independent servers configure a server system, the entirety of the system does not stop even if a failure occurs in a single physical server, but there has been a problem in that cost is large.

In addition, when a virtual server is used as a server in use on a physical server, there has been a problem in that there is overhead because input-output (I/O) operations of guest OSs are executed parallel to one another.

In addition, when a standby server operates in a cold standby state during the normal operation in a pair of physical servers including a duplex configuration including a server in use and the standby server, communication and service stop for an extended period of time after a failure occurs because an application for communication is activated after configuration information is transferred to the standby server. In addition, there has been a problem in that it takes time to begin the operation of the standby server after the occurrence of the failure.

Furthermore, in a method for realizing an N+1 redundant configuration according to the related art, cold standby is conducted after a failure occurs or each application is supposed to be able to support the N+1 redundant configuration. However, although increasingly varying applications may support a hot-standby duplex configuration, there has been a difficulty in that it costs a lot to support an host-standby N+1 duplex configuration.

In addition, although a method is possible in which a standby server corresponds to N servers in use, it is difficult in terms of cost to incorporate into varying communication applications a code that takes into consideration a redundant configuration for supporting an N+1 duplex configuration. This also decreases the reliability of the standby server.

Therefore, in the N+1 duplex configuration of a server system including a plurality of servers, a reliable redundant computer system that can suppress cost without sacrificing CPU performance and I/O performance is expected.

In addition, in order to improve reliability, a method for switching the operation, especially a method for recovering from a failure, is expected for a server system including an N+1 redundant configuration including a plurality of servers in a single chassis.

Japanese Laid-open Patent Publication Nos. 2008-276320, 2010-211819, and 2010-003022 are examples of related art.

SUMMARY

According to an aspect of the embodiments, a server includes a monitoring unit that monitors operation state of one or more physical servers in use on which same applications operate while generating, deleting, or referring to data, a synchronization unit that synchronizes the data between one of the physical servers in use and one of virtual servers in a standby physical server, which includes the same number of the virtual servers as the physical servers in use, corresponding to the one of the physical servers in use, and a switching unit that, when the monitoring unit has detected that a failure has occurred in the operation of one of the physical servers in use, activates a first application of the same applications that has operated on the one of the physical servers in use on the one of the virtual servers corresponding to the one of the physical servers in use, that operates a second application of the same applications while referring to a piece of the data on the one of the virtual servers synchronized by the synchronization unit with the data on the one of the physical servers in use, and that switches operation from the one of the virtual servers to the standby physical server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B are schematic diagrams illustrating a server system including a redundant configuration;

FIG. 4 illustrates an example of data relating to an entry of path information to be synchronized between servers in use and a standby server;

FIG. 5 illustrates an example of data relating to an entry of an Address Resolution Protocol (ARP) cache to be synchronized between the servers in use and the standby server;

FIG. 6 illustrates an example of data relating to an entry of a neighbor cache to be synchronized between the servers in use and the standby server;

FIG. 7 illustrates an example of data relating to an entry of a session and connection (Internet Protocol version 4 (IPv4)) to be synchronized between the servers in use and the standby server;

FIG. 8 illustrates an example of data relating to an entry of a session and connection (Internet Protocol version 6 (IPv6)) to be synchronized between the servers in use and the standby server;

FIG. 9 illustrates an example of data relating to an entry of address mapping information (IPv4) to be synchronized between the servers in use and the standby server;

FIG. 10 illustrates an example of data relating to an entry of address mapping information (IPv6) to be synchronized between the servers in use and the standby server;

FIG. 11A is a schematic diagram (part 1) illustrating a process for recovering from a failure executed by the server system including the redundant configuration;

FIG. 11B is a schematic diagram (part 2) illustrating the process for recovering from a failure executed by the server system including the redundant configuration;

FIG. 12 is a diagram illustrating the entirety of the server system including the redundant configuration;

FIG. 13 is a block diagram illustrating the server system including the redundant configuration;

FIG. 14 is a diagram illustrating the configuration of a server system including a redundant configuration;

DESCRIPTION OF EMBODIMENT

An embodiment will be described hereinafter with reference to the drawings.

Figure 1:
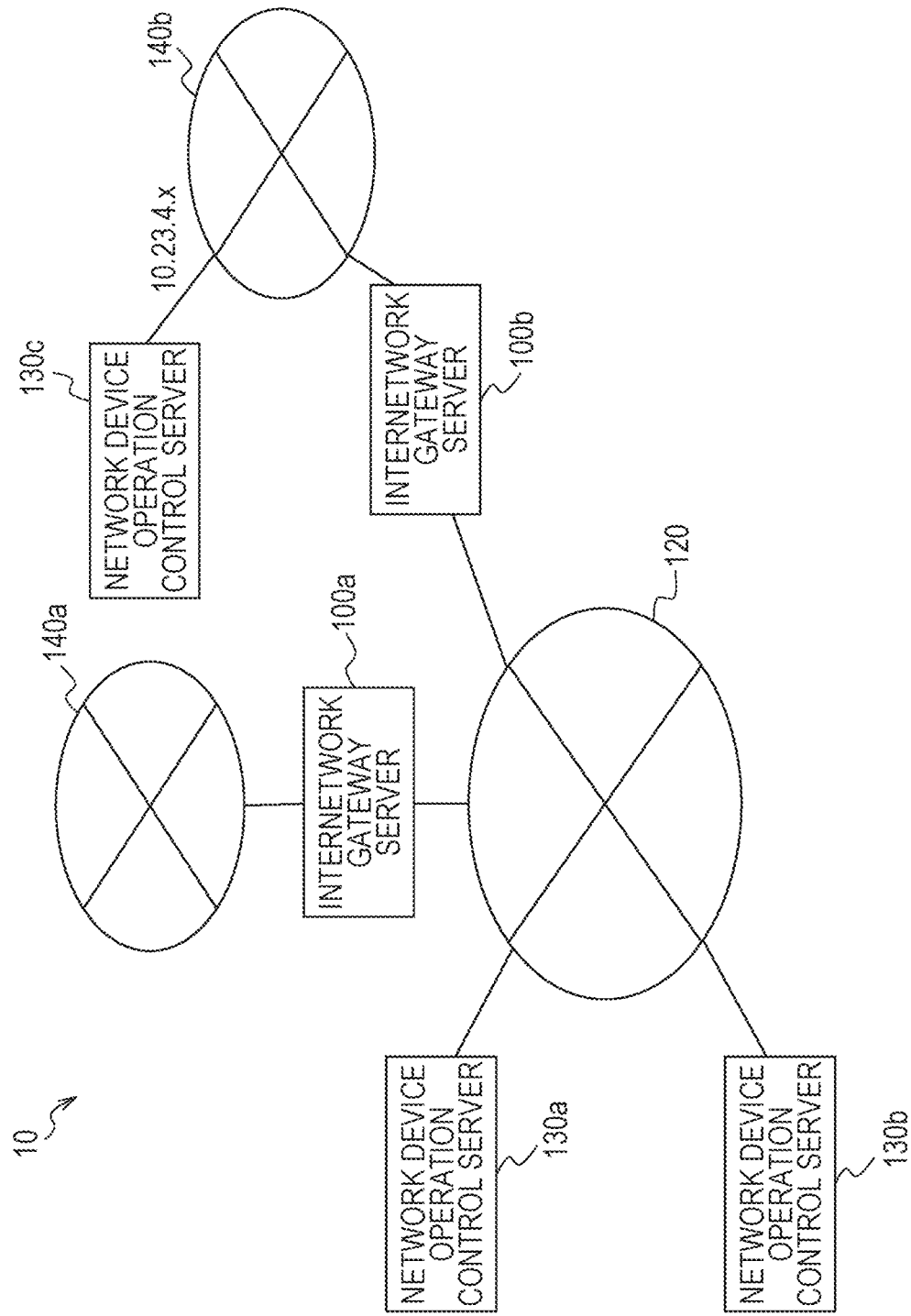
FIG. 1 is a diagram illustrating a network system in which internetwork gateway servers and network device operation control servers are used.

In the following description, first, a server system and a method for recovering from a failure according to a comparative example using an N+1 redundant configuration (hereinafter also referred to simply as the "redundant configuration") will be described with reference to FIGS. 2A to 6. Thereafter, a server system and a method for recovering from a failure according to the embodiment will be described with reference to FIGS. 3A to 23. FIG. 1 is a diagram illustrating a system in which internetwork gateway servers and network device operation control servers are used.

According to the embodiment, in a redundant configuration including one or more physical servers in use and a standby physical server, a plurality of OSs corresponding to the physical servers in use are operated by virtual servers on the standby physical server using a virtualization mechanism (virtualization unit). By synchronizing data on the physical servers in use and data in the corresponding standby servers with each other, it is possible to provide reliable apparatuses (the internetwork gateway servers and the network device operation control servers) including high availability that can promptly recover when a failure has occurred while suppressing cost without sacrificing CPU performance and I/O performance.

Overall Description

Comparative Example

FIG. 1 is a diagram illustrating a system in which a server system (internetwork gateway servers and network device operation control servers) is used. FIGS. 2A to 6 are diagrams illustrating a server system including a redundant configuration and a method for switching the operation, especially a method for recovering from a failure, according to the comparative example.

When a terminal in an intranet 140a or 140b (collectively referred to as the "intranets 140") is to access a service on an Internet 120, an internetwork gateway server 100a or 100b, respectively, is passed through. The internetwork gateway servers 100a and 100b (collectively referred to as the "internetwork gateway servers 100") used in such an environment typically have high capacity for processing packets, and therefore a server system used as the internetwork gateway servers 100 typically has high CPU power.

Network device operation control servers 130a and 130b operate and control multiple network devices on the Internet 120, and a network device operation control server 130c operates and controls multiple network devices on the intranet 140b. The network device operation control servers 130a, 130b, and 130c (collectively referred to as the "network device operation control servers 130") used in such an environment also typically have a high capacity for processing packets, and therefore apparatuses used as the network device operation control servers 130 have high CPU power.

Figure 2A:
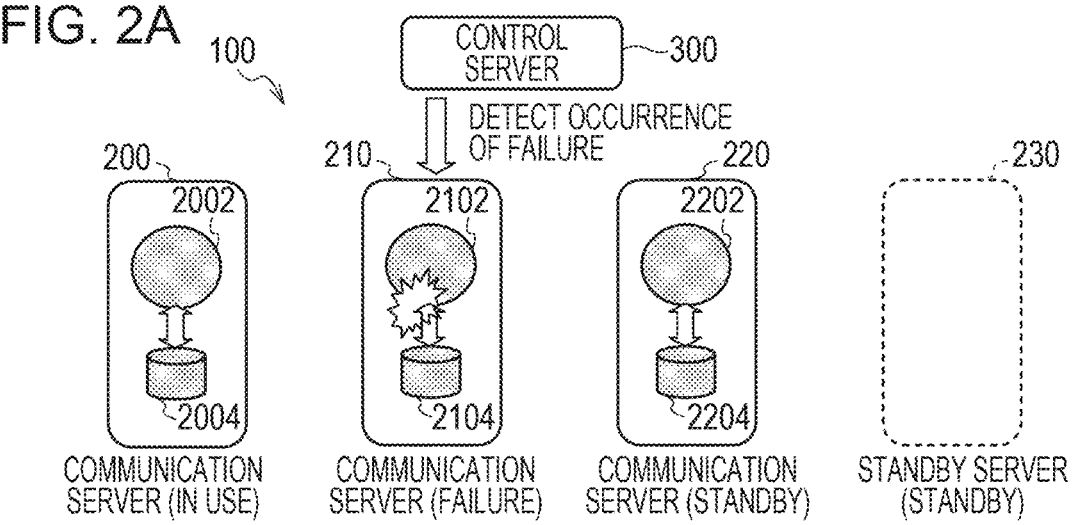
FIGS. 2A to 2C are schematic diagrams illustrating a process for recovering from a failure according to a comparative example executed by a server system including a redundant configuration.
Figure 2B:
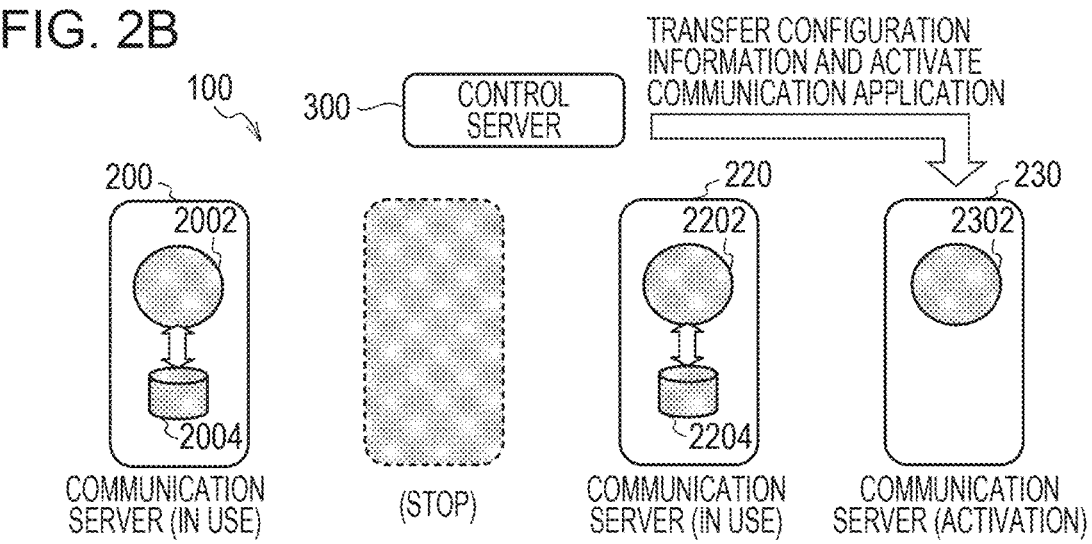
Figure 2C:
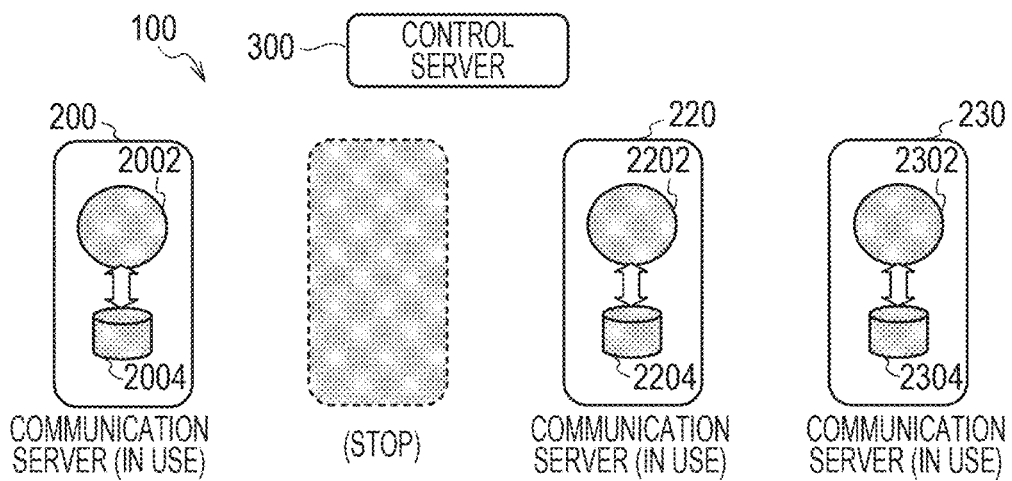

FIGS. 2A to 2C schematically illustrate the method for recovering from a failure according to the comparative example used by a server system 100 including a redundant configuration in which four physical servers are included.

The server system 100 illustrated in FIGS. 2A to 2C includes communication servers operated by OSs 200, 210, 220, and 230, respectively, that make up the redundant configuration and a control server 300. The communication servers and the control server 300 are stored in a single chassis. Among the plurality of servers operated by the OSs 200, 210, 220, and 230, the servers operated by the three OSs 200, 210, and 220 are servers in use, and the other, which can be operated by the OS 230, is a standby server. The standby (redundant) server is in a cold standby state while the server system 100 is operating normally, and therefore the OS 230 is indicated by a broken line in FIG. 2A, which illustrates a state immediately after occurrence of a failure. Communication applications 2002, 2102, and 2202 are operating on the OSs 200, 210, and 220, respectively. These communication applications 2002, 2102, and 2202 generate and use pieces of communication application data 2004, 2104, and 2204, respectively, during the operation thereof.

The control server 300 monitors the communication servers operated by the OSs 200, 210, 220, and 230, respectively, and controls switching of the operation between the communication servers. For this reason, the control server 300 holds configuration information regarding each communication server monitored thereby.

FIG. 2A is a diagram illustrating an example in which the control server 300 has detected a failure that has occurred in the communication application 2102. This failure may be a physical failure in the server operated by the communication application 2102 or may be a software failure, that is, for example, trouble in the operation of the communication application 2102. At this time, the standby server is in the cold standby state (on standby).

In FIG. 2B, the cold standby state of the redundant server is released, and the OS 230 that operates the server and the communication application 2302 that operates on the OS 230 are activated. Upon the activation of the OS 230, the configuration information regarding the server in which the failure has occurred is transferred from the control server 300. At the same time, the server in which the failure has occurred, that is, the server operated by the OS 210, stops.

In FIG. 2C, the communication server that has originally been the standby server is operated as a server in use.

In the above-described method, a communication application is activated after the control server detects a failure in one of the servers in use and the configuration information is transferred to the standby server. Therefore, communication and service are not available for an extended period of time.

Although a method is also possible in which the standby server is configured to correspond to N servers in use, it is difficult in terms of cost to incorporate an N+1 duplexing code that takes an N+1 redundant configuration into consideration into varying communication applications, and the reliability of the standby server decreases.

Configuration of Server System

The configuration of a server system (an internetwork gateway server or a network device operation control server) 110 according to the embodiment will be described with reference to FIGS. 3A to 10. The server system (hereinafter also referred to simply as the "apparatus") 110 has an N+1 redundant configuration (hereinafter also referred to simply as the "redundant configuration"). The server system 110 may be used as the server system 100 or the network device operation control server 130 illustrated in FIG. 1.

As a method for realizing the N+1 redundant configuration, a virtualization technique, that is, a virtualization mechanism, is known in which a virtual machine is configured on a single physical machine and a plurality of OSs are executed parallel to one another. This virtualization mechanism is also referred to as the "virtualization method" herein. Such a technique may be a virtual machine method or a logical partitioning method. A machine adopting such a technique is referred to as a machine utilizing a virtualization function, or a virtual machine. If the virtual machine is a server, the machine is also called a "virtual server". An OS that operates on the virtualization mechanism is referred to as a "guest OS". An OS on which the virtualization mechanism operates is referred to as a "host OS". That is, N+1 guest OSs are executed parallel to one another on a single physical machine operated by a host OS in order to realize a configuration as if there are N+1 machines. The redundant configuration is realized by using N machines as servers in use and the other as a standby (redundant) server.

In the virtual machine method, control software called "virtual machine monitor (VMM)" virtualizes registers and the like for controlling the operation of hardware and processors of machines in order to realize a plurality of VMs on a single physical machine. At this time, guest OSs operate on the virtual machines generated by the VMM. More specifically, the VMM creates virtual machines by trapping privileged instructions from a CPU executed by the guest OSs, such as an I/O instruction and a control register, and by converting the privileged instructions into access to actual physical devices to emulate (process) the physical devices. In the virtual machine method, a plurality of guest OSs can share a single physical I/O device.

In the I/O control of the virtual machine method, the VMM emulates the I/O control of the guest OSs, and therefore overhead is generated. If there are a plurality of operating guest OSs, the VMM simultaneously executes the I/O control of the plurality of guest OSs parallel, it might not be easy to predict the amount of overhead.

On the other hand, in the logical partitioning method, control software called "hypervisor" logically partitions the resource of a physical machine in order to realize a plurality of VMs on the single physical machine. That is, the hypervisor logically partitions the single physical machine by controlling registers and tables referred by hardware such as a processor. A guest OS is executed within each division (logical partition) obtained as a result of the partitioning by the hypervisor. That is, privileged instructions such as an I/O instruction executed by the guest OSs is not emulated but directly executed by the processor of the physical machine. In the logical partitioning method, because of the configuration of this method, the operation of a certain guest OS is hardly affected by the operation of another guest OS running on the same physical machine. On the other hand, a plurality of guest OSs do not share a single physical I/O device. The hypervisor will also be referred to simply as the "host OS" herein.

In general, the virtualization mechanism is suitable when, in a communication control telecommunication server or a communication computer system that has high availability and good cost performance, a blade server is used as a computer system including a redundant configuration or when, among boards used in an Advanced Telecommunications Computing Architecture (AdvancedTCA; trademark) chassis, packet processing boards whose unit cost is high and whose quantity used affects packet processing capacity as an apparatus are used in a redundant configuration. The virtualization unit in the apparatus according to the embodiment may be a unit that uses the virtual machine method or a unit that uses the logical partitioning method.

In the server system 110, among a plurality of physical servers included in the redundant configuration, virtual machines (virtual servers) are realized only in a single standby physical server (hereinafter also referred to simply as the "standby server").

The server system 110 illustrated in FIG. 3 includes communication servers (include a standby physical server) operated by OSs 200, 210, 220, and 240, respectively, that make up the redundant configuration and a control server 300, and the communication servers and the control server 300 are stored in a single chassis. However, the communication servers and the control server 300 don't have to be stored in a single chassis. Among the plurality of servers operated by the OSs 200, 210, 220, and 240, the servers operated by the three OSs 200, 210, and 220 are physical servers in use (hereinafter also referred to simply as the "servers in use") and the other server operated by the OS 240 is a standby server. The standby server includes the virtualization unit, and virtual servers are constructed by virtualizing the standby server using the virtualization unit. The OS 240 is a host OS of the standby server, and guest OSs 242, 244, 246 can operate thereon. The server system 110 is different from the comparative example illustrated in FIGS. 2A to 2C in that the virtual servers corresponding to the servers in use are constructed on the standby server. Each virtual server communicates with the corresponding server in use, and pieces of data regarding applications, that is, for example, communication applications, are synchronized with each other.

The virtualization unit that provides virtual machines is included not only in the standby server but also in each server in use, and each server in use is configured to be able to operate guest OSs on a host OS thereof.

The control server 300 has a monitoring unit that monitors the operation states of the plurality of servers operated by the OSs 200, 210, 220, and 240 and has configuration information regarding each communication server monitored by the monitoring unit. The control server 300 has a synchronization unit that synchronizes data regarding communication applications between the servers in use and the standby server. The synchronization unit synchronizes the data regarding the communication applications between the servers in use and the standby server, but the server in which virtual machines have been constructed by the virtualization unit may have a function of synchronizing the data between the guest OSs and the host OS. The function of synchronizing the data between the guest OSs and the host OS may be prepared separately from the synchronization unit (a first synchronization unit) as a transfer unit (a second synchronization unit). The transfer unit may be included in the virtualization unit.

The control server 300 also has a switching unit that controls the switching of the operation from a server in which a failure has occurred to a standby server when the failure has occurred in any of the servers in use. The switching unit (a first switching unit) controls the switching of the operation between a server in use and a standby server that are physically separate from each other. However, for example, when a virtual machine operated by a guest OS serves as a server in use and a server operated by a host OS serves as a standby server on a single physical server in which virtual machines are realized by the virtualization mechanism, the operation might be switched from the server in use to the standby server. This function of switching may be included in the switching unit or may be included in a movement unit (a second switching unit) that is separate from the switching unit. The movement unit may be included in the virtualization unit.

In the server system 110, normally a plurality of guest OSs are activated by the virtualization unit only on the standby server. In general, the standby server does not use large CPU power and overhead does not matter as a machine that uses the virtualization function. On the other hand, the servers in use large CPU power for the normal operation. However, by adopting the configuration according to the embodiment, the servers in use that waste CPU power do not include overhead that would otherwise accompany the use of the virtualization mechanism, and therefore high processing capacity can be achieved.

In the server system 110, the control server 300 includes the monitoring unit that monitors the operation states of the servers in use and the synchronization unit that synchronizes data on the servers in use and data on the standby virtual server with each other. That is, the operation states of the servers in use and the standby server are monitored by the monitoring unit of the control server 300, and the data on the servers in use and the data on the standby virtual server are synchronized with each other by the synchronization unit of the control server 300. The operation of each server in use is also monitored by the corresponding virtual server. That is, the virtualization unit may include the monitoring unit, the synchronization unit, and the switching unit.

When a failure has occurred in a server in use, the communication server operated by the server in use is backed up by the corresponding OS in the standby server. The host OS and the guest OSs in the standby server operated by the virtualization mechanism provide the same application programming interface (API) for applications, but applications operating on the servers in use don't have to be the same. Needless to say, the host OS and the guest OSs on the standby server may be the same, and Linux (trademark) may be used.

The API provided by the host OS operating on each server in use and the host OS and the guest OSs operating on the standby server may be one that can be used by all applications operating on the OSs. However, APIs to be uniquely used by the OSs upon switching between the OSs are not limited to this.

It is sufficient for the applications to be able to operate on the two types of servers, namely the servers in use and the standby server, that is, for example, the virtual servers constructed on the standby server, and don't have to take the redundant configuration into consideration. Therefore, the applications operating on each server in use don't have to be the same. Furthermore, a plurality of applications may operate on a single server in use.

FIGS. 3A and 3B are schematic diagrams illustrating the server system 110 adopting the redundant configuration. The server system 110 in this example includes the three servers in use and the standby server in which the virtualization mechanism operates. Needless to say, the number of servers in use is not limited to 3, and an arbitrary number of servers may be used.

FIG. 3A illustrates an example in which the standby server is being activated. The host OS 240, the guest OSs 242, 244, and 246, and communication applications 2422, 2442, and 2462 that can operate on the guest OSs 242, 244, and 246, respectively, are indicated by broken lines. In the server system 110 adopting the redundant configuration, the same number of guest OSs as the OSs of the servers in use are operating on the host OS of the standby server. That is, it can be said that the standby server is in a warm standby state.

FIG. 3B illustrates an example in which the server system 110 is normally operating. In this state, pieces of data 2424, 2444, and 2464 regarding communication applications synchronized with pieces of data 2004, 2104, and 2204, respectively, regarding communication applications 2002, 2102, and 2202, respectively, that operate on the servers in use are stored in the guest OSs 242, 244, and 246, respectively, in the standby server. That is, the pieces of data regarding the applications are synchronized between the servers in use and the standby server. If there is a change in the piece of data 2004, 2104, or 2204 in the server in use, the data is transferred to a guest OS in the standby server corresponding to the server in use, in order to synchronize the pieces of data regarding the application. During the operation of the server system 110, the pieces of data 2424, 2444, and 2464 on the standby server operated by the guest OSs 242, 244, and 246, respectively, are kept synchronized with the pieces of data 2004, 2104, and 2204 on the OSs 200, 210, and 220, respectively, of the corresponding servers in use. This synchronization process is executed by the synchronization unit included in the control server 300 and/or the standby server.

Examples of data to be synchronized can include the following: 1) path information (a Link-State Advertisement (LSA) or the like; 2) an ARP cache table; 3) a neighbor cache table; 4) Transmission Control Protocol (TCP)/User Datagram Protocol (UDP) session information; 5) Hypertext Transfer Protocol (HTTP)/Hypertext Transfer Protocol Secure (HTTPS) connection information; 6) Network Address Translation (NAT) address mapping information; 7) Quality of Service (QoS) uniform allocation bandwidth information; 8) access prohibition information for a firewall (filtering information); 9) a flow table; 10) various pieces of statistical information; and 11) apparatus states.

FIG. 4 illustrates an example of data including the path information. The data illustrated in FIG. 4 has a format according to Request for Comments (RFC) 4340. Although an LSA including a format according to an industry standard provided by the Internet Engineering Task Force (IETF), such as RFC, is taken as an example here, the data is not limited to the LSA so long as the data includes path management information according to a routing protocol.

FIG. 5 illustrates an example of the ARP cache table. The data illustrated in FIG. 5 has a format according to RFC 826, RFC 5227, and RFC 5459. The ARP cache table is a table that associates the Media Access Control (MAC) address of a destination for transmitting an Ethernet (trademark) frame in a TCP/Internet Protocol (IP) network with the IP address of the destination.

FIG. 6 illustrates an example of the neighbor cache table. The data illustrated in FIG. 6 has a format according to Chapter 4.4 of RFC 2461. The chapter neighbor cache table is a table used for mapping of an IP address and a MAC address according to IPv6.

The TCP/UDP session information is information relating to a session according to the TCP or the UDP, which is a protocol used for a one-to-one communication process.

The HTTP/HTTPS connection information is information relating to connection according to the HTTP or the HTTPS, which is a protocol whose security is reinforced from the communication according to the HTTP.

FIGS. 7 and 8 illustrate examples of data including the TCP/UDP session information and the HTTP/HTTPS connection information.

The NAT address mapping information is information relating to correspondence between addresses using NAT. In general, the NAT address mapping information is information for associating a private IP address and a global IP address. FIGS. 9 and 10 illustrate examples of data including the NAT address mapping information according to IPv4 and IPv6, respectively.

The QoS uniform allocation bandwidth information is information relating to a bandwidth preserved for a particular type of communication to assure a certain communication speed in a network.

The flow table is information that represents the flow of data by combining a particular IP address, a port number, a MAC address, a Multiprotocol Label Switching (MPLS) label, an input port, and the like.

The various pieces of statistical information may include the amount of traffic.

The apparatus states may be arbitrary amounts so long as the apparatus states are amounts that characterize the operation of a server, such as power consumption, the operation rate of a CPU, and the temperature of the CPU.

The hardware configuration of the server system 110 is not limited to the configuration illustrated in FIGS. 3A and 3B. More specifically, any configuration may be adopted so long as the server system 110 has a redundant configuration in which a plurality of servers are included and in which an application is operated on each server while referring to data, at least one of the plurality of servers operates as a standby server, the other servers operate as servers in use, the standby server is virtualized using a virtualization unit to realize a plurality of virtual servers (virtual machines), OSs corresponding to OSs of the servers in use operate in the virtual servers, and pieces of data regarding applications operated on the servers in use are synchronized between the servers in use and the corresponding virtual servers on the standby server. The server system 110 may or do not be stored in a single chassis. In the configuration illustrated in FIG. 3, the server system 110 is stored in a single chassis.

In addition, the standby server at least includes a transfer unit that synchronizes pieces of data on a host OS and guest OSs with each other in the virtual servers.

By realizing such a configuration, the server system 110 obtains an advantage in that the entirety of the system does not stop due to a failure in a single physical server. In addition, since the servers in use are not virtualized, there is an advantage in that no overhead is generated by the virtualization in the normal operation. Furthermore, in the normal operation, since the guest OSs operate in the standby server and pieces of data regarding applications are synchronized with each other between the standby server and the servers in use, power consumption can be suppressed compared to in the case of host standby. In addition, high availability can be realized. Furthermore, since it is sufficient for the application to take only the duplex configuration into consideration, it is easy to develop application cost, thereby increasing the reliability of the applications themselves and the system in which the applications operate. In addition, there is an advantage in cost because of the redundant configuration and the reliability of a network can be increased.

Process for Recovering from Failure

A process for recovering from a failure executed by the server system 110 including the redundant configuration realized by the virtualization function will be described with reference to FIGS. 11A to 11D.

FIG. 11A illustrates an example in which a hardware or software failure has occurred in one of the plurality of servers in the server system 110 operated by the OS 210 illustrated in FIG. 3B and the control server 300 has detected the failure. At this time, the data 2104 regarding the application 2102 operating on the OS 210 and the data 2444 on the guest OS 244 in the standby server are synchronized with each other. However, the application 2442 is not operating.

In FIG. 11B, since the control server 300 has detected the failure in one of the servers in use, the operation is switched from the server in use in which the failure has been detected to the corresponding guest OS 242, 244, or 246 (OS 244 in this case) in the standby server, and the standby server begins communication and service. At the same time, the server in use in which the failure has been detected, that is, the server operated by the OS 210, is stopped.

Figure 11C:
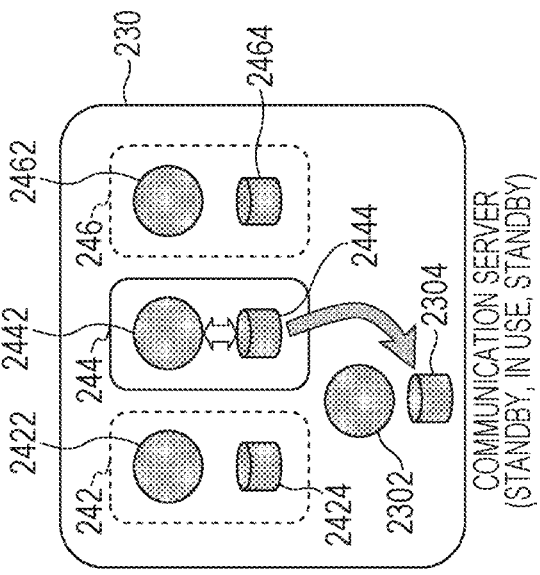
FIG. 11C is a schematic diagram (part 3) illustrating the process for recovering from a failure executed by the server system including the redundant configuration.

In FIG. 11C, the control server 300 judges whether or not performance decreases when the communication application 2442 operates on the guest OS 244. If performance decreases, the application 2302 is activated on the host OS 230 as a new standby server, and data 2304 on the new standby server is synchronized with the data 2444 on the same physical server. This switching of the operation may be executed by the switching unit included in the control server 300 or may be executed by the movement unit, which is separate from the switching unit, included in the control server 300.

Figure 11D:
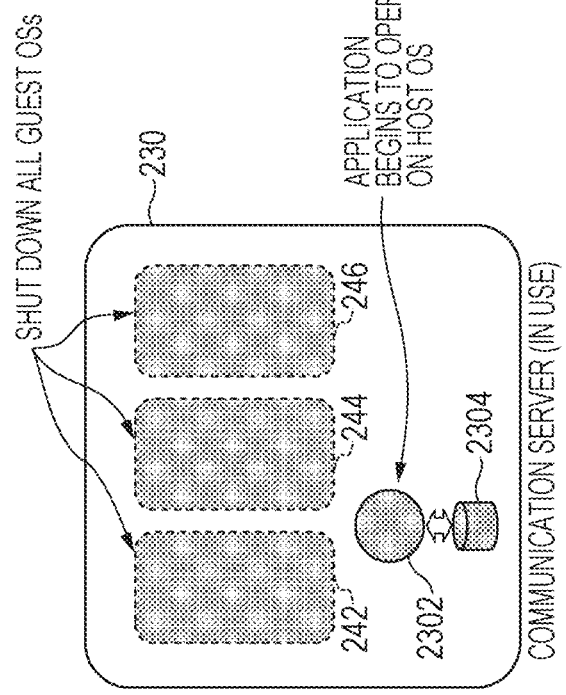
FIG. 11D is a schematic diagram (part 4) illustrating the process for recovering from a failure executed by the server system including the redundant configuration.

In FIG. 11D, all the guest OSs 242, 244, and 246 are shut down. Thus, the communication applications 2422, 2442, and 2462 operate on the host OS 230 as the servers in use, and it is possible to keep performance from decreasing that would otherwise occur due to the parallel operation of the virtual machines.

The switching from the state illustrated in FIG. 11C to the state illustrated in FIG. 11D is executed on the same physical server, and therefore there are several methods for synchronizing pieces of data. For example, the methods include the following: 1) synchronization through a network in the virtual servers; 2) synchronization by a memory map; 3) synchronization by a shared disk; and 4) synchronization by a combination between at least two of the above 1) to 3)).

In the first synchronization method, that is, the synchronization through a network in the virtual servers, data is synchronized from a virtual server operated by a guest OS to the physical server operated by the host OS through a virtual network using the same method as that for switching from the server in use to the standby virtual server in the opposite procedure. This method for synchronizing data can be executed by the synchronization unit included in the control server 300 and/or the standby server.

The second synchronization method, in which a memory map is used, is a method for synchronizing data by mapping a region of a memory space in a virtual server and a region of a memory space of an application operating on a physical server in which data to be synchronized is held. By using this method, switching can be executed at high speed.

The third method, in which a shared disk is used, includes the following operations. First, a shared disk is set between the virtual servers and the physical server. For example, a Network File System (NFS) server is activated on the physical server side, and the virtual server side shares the disk as an NFS client. Next, applications operating on the virtual servers write data to be synchronized to the disk. After the operation is switched from the virtual servers to the physical server, an application operating on the physical server uses the data written to the shared disk.

The fourth method is a method obtained by combining at least two of the first to third methods.

The above three methods other than the first method may be executed by the transfer unit, which is separate from the synchronization unit, that synchronizes data between the servers in use and the standby server. That is, the transfer unit synchronizes data on the host OS and data on the guest OSs with each other in the virtualized servers.

The units included in the control server 300, that is, the monitoring unit, the synchronization unit, and the switching unit, are executed by software programs or dedicated pieces of hardware.

In the past, communication would sometimes stop for tens of seconds to several minutes until restart after data is set from the servers in use to the standby server upon occurrence of a failure, but by using the above-described methods, switching can be completed within several seconds without decreasing performance.

Embodiment

A server system 110 and a method for recovering from a failure executed by the server system 110 will be described with reference to FIGS. 12 to 23.

In the following description, a server system including four blades in a chassis will be described. Three blades serve as physical servers in use (hereinafter also referred to simply as the "servers in use"), and the other blade serves as a standby (redundant) physical server (hereinafter also referred to simply as the "standby server"). However, it is obvious to one skilled in the art that the number of blades is not limited to this value and may be an arbitrary number.

Configuration of Server System

First, the configuration of the server system 110 will be described with reference to FIGS. 12 to 16. The server system 110 servers as the internetwork gateway server 100 or the network device operation control server 130 illustrated in FIG. 1.

FIG. 12 is a diagram illustrating the entirety of the server system 110. The server system 110 includes servers in use 1202, 1204, and 1206 operated by OSs in use #1, #2, and #3 (200, 210, and 220), respectively, a standby server 1208 operated by a host OS 230, and switches 1210 and 1212. In the normal operation, the servers in use 1202, 1204, and 1206 are connected to the switches 1210 and 1212. Three virtual machines (virtual servers) operated by guest OSs #1, #2, and #3 (242, 244, and 246), respectively, are realized on the host OS 230 of the standby server 1208 using the virtualization function.

The OSs #1, #2 and #3 in the standby server 1208 correspond to the guest OSs 242, 244, and 246, respectively, illustrated in FIG. 3, and virtual machines operated by the guest OSs #1, #2, and #3 correspond to the virtual machines operated by the guest OSs 242, 244, and 246, respectively, illustrated in FIG. 3.

The three virtual machines (virtual servers) constructed on the standby server 1208 are connected to the switch 1212 through a soft switch 248. In the normal operation of the servers in use 1202, 1204, and 1206, the three virtual machines don't have to be connected to the switch 1210.

The servers in use 1202, 1204, and 1206 and the standby server 1208 correspond to the communication servers operated by the OSs 200, 210, 220, and 240, respectively, illustrated in FIG. 3.

The switch 1210 is provided between a set of the servers 1202, 1204, 1206, and 1208 and an external Internet 120 and intranet 140. Class A IP addresses "10.23.4.121", "10.23.4.122", and "10.23.4.123" are assigned to the servers 1202, 1204, and 1206, respectively. These class A IP addresses are also provided for the servers operated by the host OSs #1, #2, and #3 (242, 246, and 246), respectively, operating on the standby server 1208 or the standby guest OSs #1, #2, and #3, respectively. A class A IP address "10.23.4.124" is assigned to the host OS of the standby server.

The switch 1212 is a switch of an internal maintenance Ethernet network. Class C IP addresses "192.168.1.1", "192.168.1.2", and "192.168.1.3" are assigned to the servers in use 1202, 1204, and 1206, respectively. "192.168.1.4" is assigned to the standby server 1208 operated by the host OS 230. "192.168.1.41", "192.168.1.42", and "192.168.1.43" are assigned to the OSs of the virtual machines realized on the standby server 1208 by using the virtualization unit, that is, the guest OS #1, #2, and #3 (242, 244, and 246), respectively.

Data accompanying the applications 2002, 2102, and 2202 operating on the servers in use 1202, 1204, and 1206, respectively, is synchronized with data on the three virtual servers through the internal maintenance Ethernet network that connects the servers in the server system 110 to one another.

The switch 1210 or 1212 serves as the control server 300. That is, the switch 1210 or 1212 includes the monitoring unit, the synchronization unit, and the switching unit. The monitoring unit monitors whether or not a failure occurs in the servers in use 1202, 1204, and 1206. The synchronization unit synchronizes data regarding applications between the servers in use 1202, 1204, and 1206 and the standby server. The switching unit appropriately controls the switch 1210 and also has functions of controlling the operation of the servers in use 1202, 1204, and 1206 and the standby server 1208, especially a function of switching the operation between the servers in use 1202, 1204, and 1206 and the standby server 1208. The switch 1212 is electrically connected to the servers in use 1202, 1204, and 1206 and the standby server 1208 through the internal maintenance Ethernet network.

When a network card that supports the virtualization, such as Single Root Input-Output Virtualization (SR-IOV), is used, the soft switch 248 may be included in the network card.

FIG. 13 is a block diagram illustrating the server system 110 illustrated in FIGS. 11A to 11D.

The server system 110 includes the servers in use 1202, 1204, and 1206 and the standby (redundant) server 1208. The host OSs 200, 210, 220, and 230 operate on these servers, respectively. In the servers in use 1202, 1204, and 1206, applications 2002a and 2002b, 2102a to 2102d, and 2202 directly operate on the host OSs 200, 210, and 220, respectively. On the other hand, in the standby server 1208, three virtual machines 1210, 1212, and 1214 are realized on the host OS 230 using the virtualization mechanism and operated by the guest OSs 242, 244, and 246, respectively. Furthermore, flow engines (middleware) 2424, 2444, and 2464 and the applications 2002a and 2002b, 2102a to 2102d, and 2202 operate on the three guest OSs 242, 244, and 246, respectively. That is, the applications 2002a and 2002b, 2102a to 2102d, and 2202 are operable in the duplex configuration. In the present embodiment, the host OS is Linux. However, the host OS is not limited to Linux. In addition, the host OSs of the servers in use and the standby server don't have to be the same, and the host OSs of the plurality of servers in use don't have to be the same, so long as these host OSs offer the same API.

Figure 15:
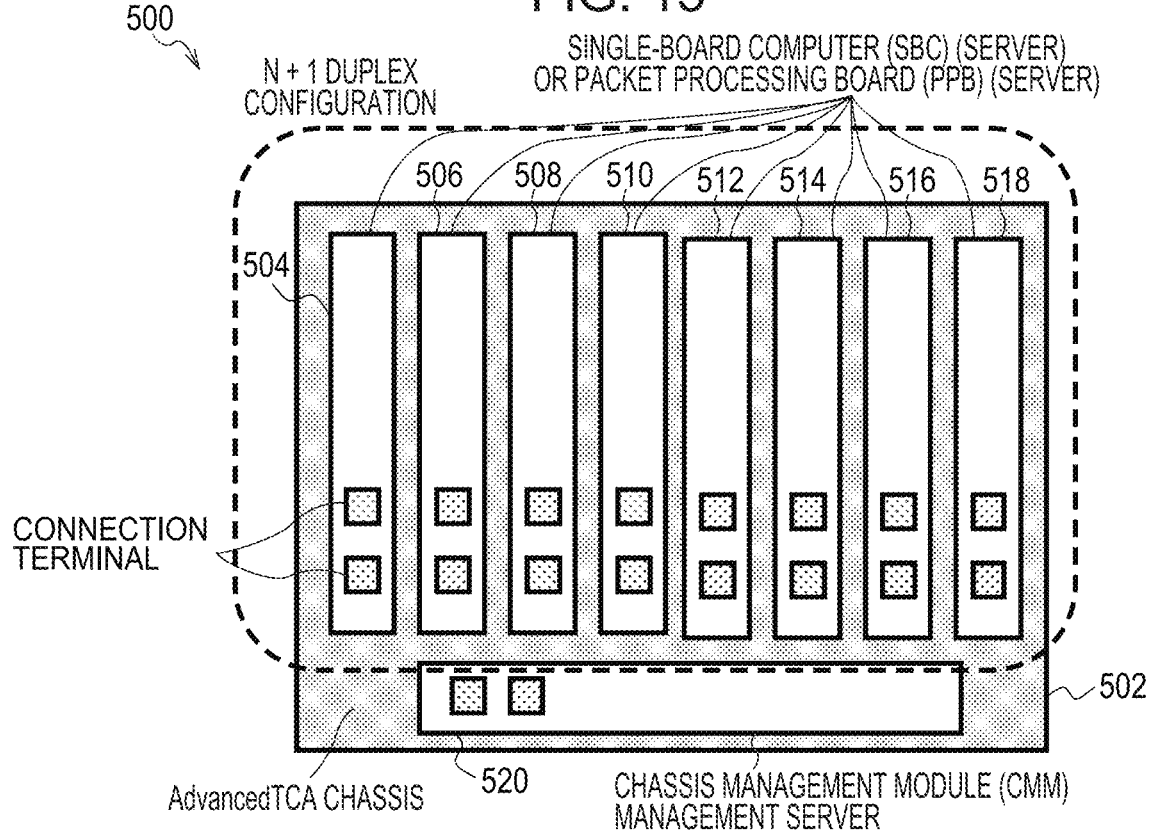
FIG. 15 is a diagram illustrating the configuration of another server system including a redundant configuration.
Figure 16:
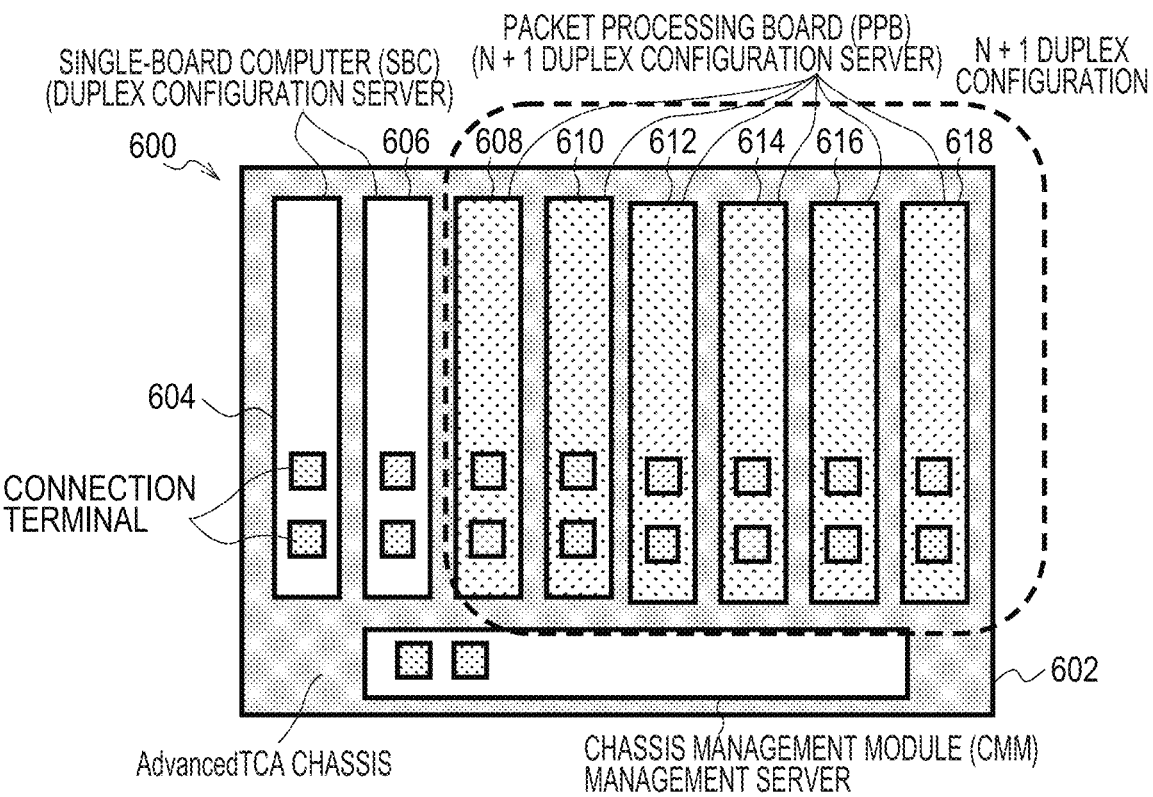
FIG. 16 is a diagram illustrating the configuration of yet another server system including a redundant configuration.

FIGS. 14 to 16 illustrate examples of the hardware configuration of the above-described server system 110.

FIG. 14 illustrates a blade server 400 including the system configuration illustrated in FIGS. 12 and 13. In the blade server 400, a plurality of blades (four blades in FIGS. 14) 402, 404, 406, and 408 are incorporated into a blade chassis 410. Although not illustrated, a chassis management module (CMM) that serves as the control server 300 may also be incorporated. The blades 402, 404, 406, and 408 are removably inserted into the blade chassis 410, and therefore the space occupied by these blades 402, 404, 406, and 408 is smaller than in the case of using a rack. Each blade in the blade server 400 has an N+1 redundant configuration including a CPU. A network connection terminal such as a terminal according to an Ethernet standard is provided for each blade.

FIG. 15 illustrates an example of an AdvancedTCA server 500.

The AdvancedTCA server 500 can include an AdvancedTCA chassis 502, single board computer (SBC) blades or packet processing board (PBB) blades 504, 506, 508, 510, 512, 514, 516, and 518, a CMM 520, a Rear Transition Module (RTM), which is not illustrated, and the like. An SBC blade is a blade on which a CPU is mounted, and a PBB blade executes packet processing. The AdvancedTCA server 500 illustrated in FIG. 15 has eight SBC blades or PBB blades, and these blades make up the N+1 redundant configuration. The RTM is an extension module mounted together with the blades and includes a hard disk, a fiber channel, and an I/O circuit such as an IP circuit. The AdvancedTCA chassis 502 is a chassis into which the above-described units are incorporated. The CMM 520 monitors and controls the state of each unit incorporated into the AdvancedTCA chassis 502. The CMM 520 can execute the function of the control server 300.

Although the CMM 520 is included to execute the function of the control server 300 in this example, the standby server in the N+1 redundant configuration may execute the function of the control server 300 instead.

In an AdvancedTCA server 600 illustrated in FIG. 16, only a part of a plurality of SBC or PBB blades 604, 606, 608, 610, 612, 614, 616, and 618 incorporated into an AdvancedTCA chassis 602 make up the N+1 redundant configuration. More specifically, the SBC or PBB blades 604 and 606 make up a server including a duplex configuration, and the SBC or PBB blades 608, 610, 612, 614, 616, and 618 make up the N+1 redundant configuration.

Process for Recovering from Failure

A process for recovering from a failure executed by the server system 110 will be described with reference to FIGS. 17 to 23.

Figure 17:
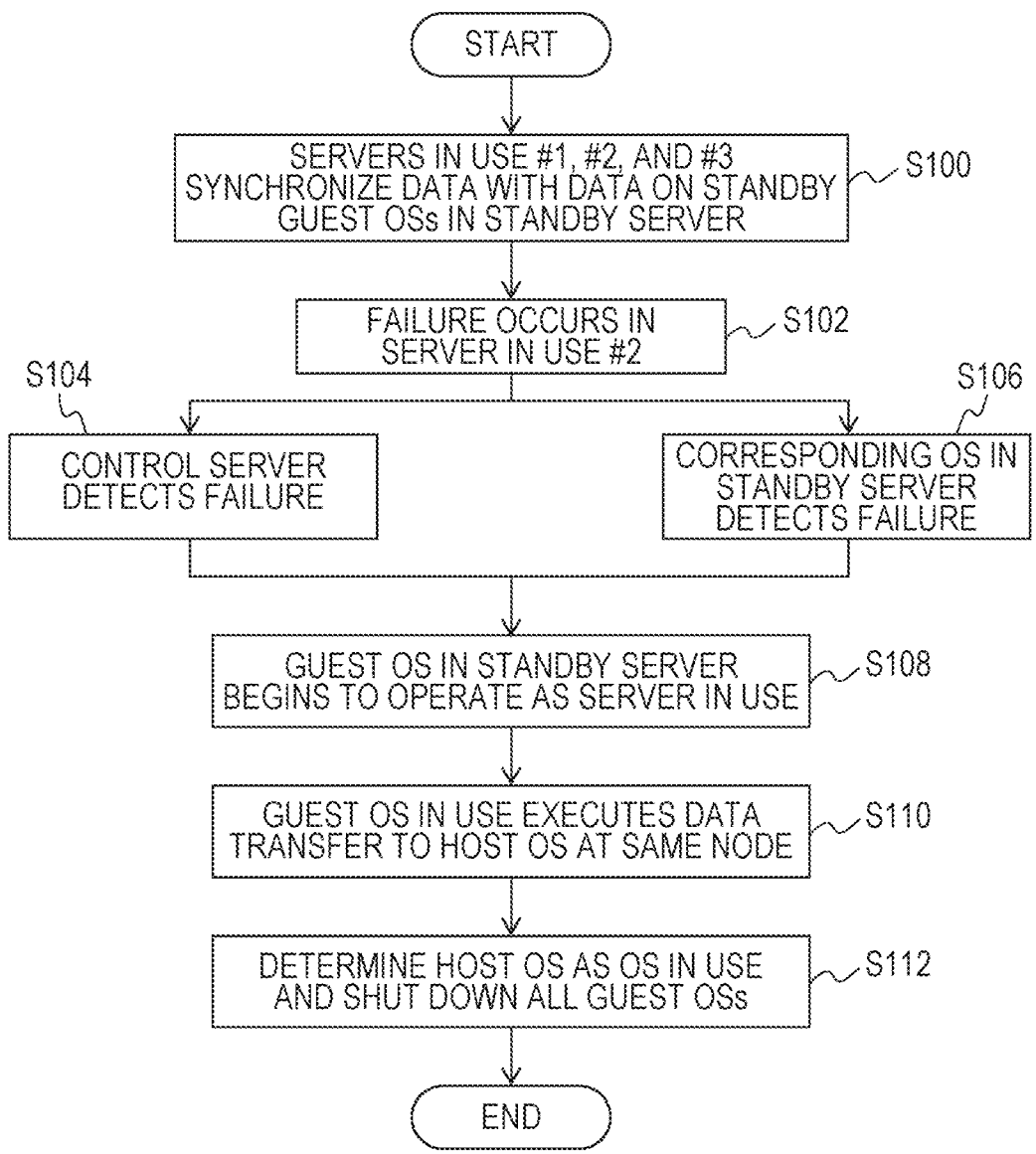
FIG. 17 is a flowchart illustrating the process for recovering from a failure executed by the server system including the redundant configuration.
Figure 18:
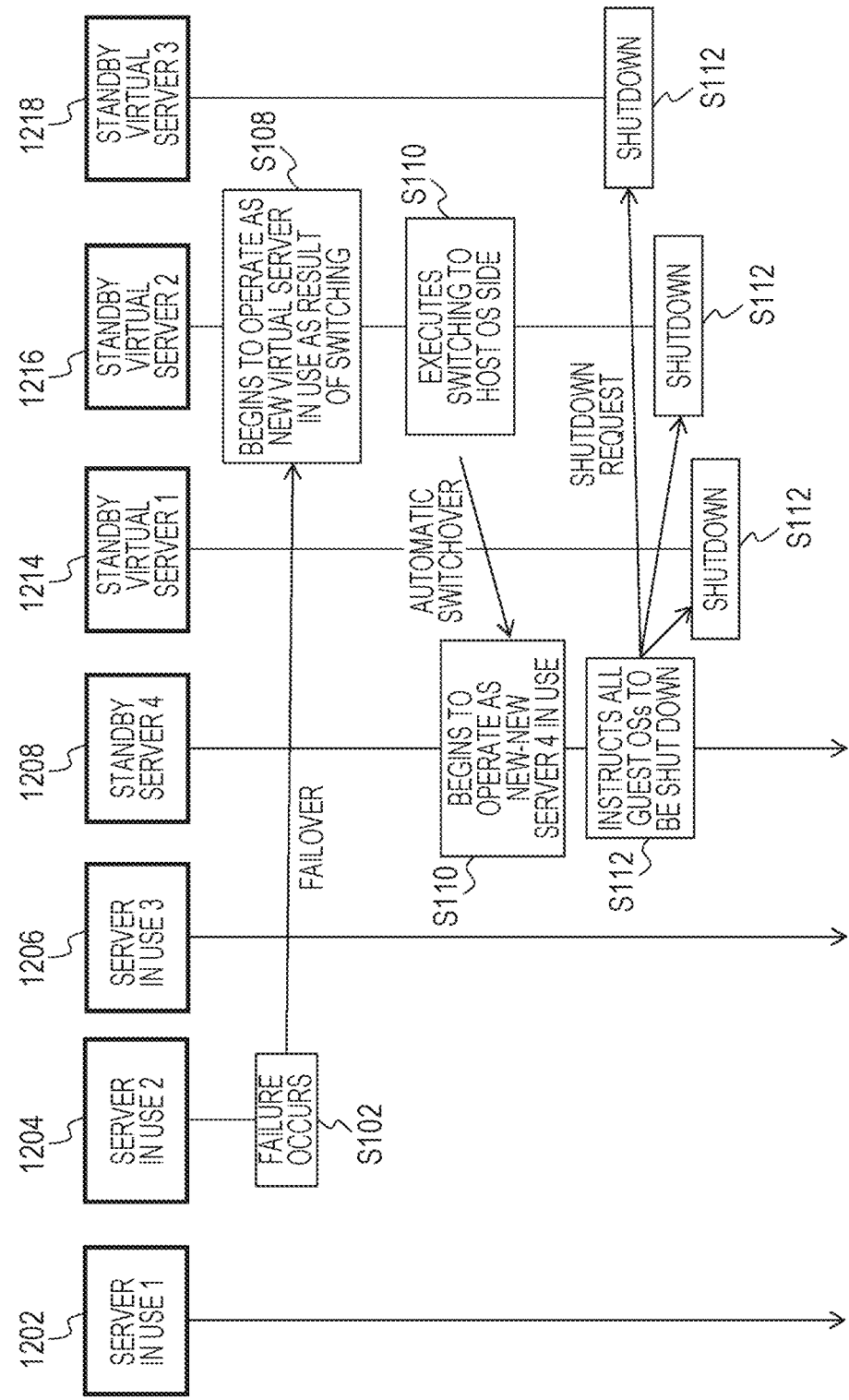
FIG. 18 is a sequence diagram illustrating the process for recovering from a failure executed by the server system including the redundant configuration.
Figure 19:
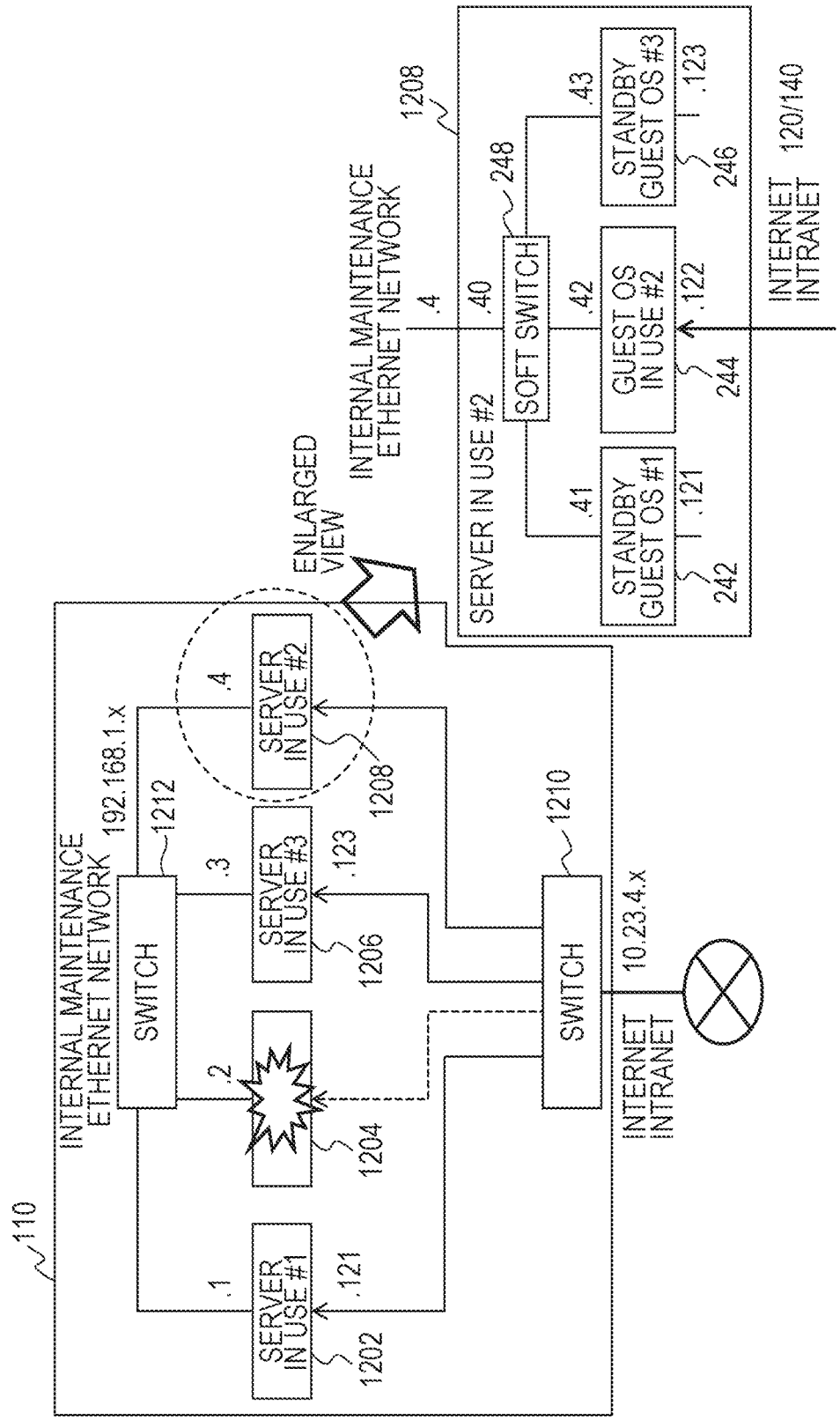
FIG. 19 is a diagram illustrating the entirety of the server system including the redundant configuration immediately after switching upon a failure.
Figure 20:
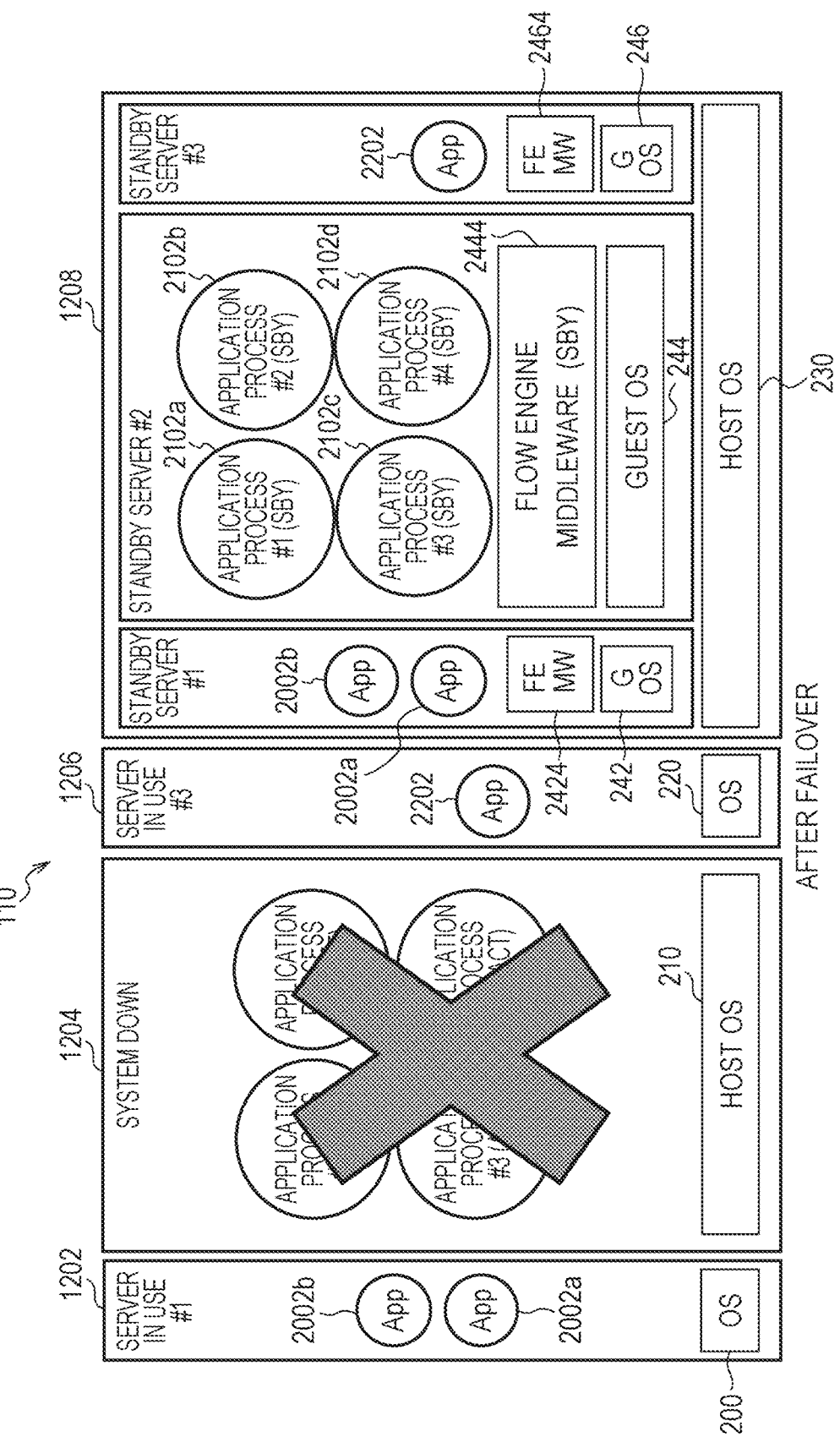
FIG. 20 is a block diagram illustrating the server system including the redundant configuration immediately after the switching upon the failure illustrated in FIG. 19.
Figure 21:
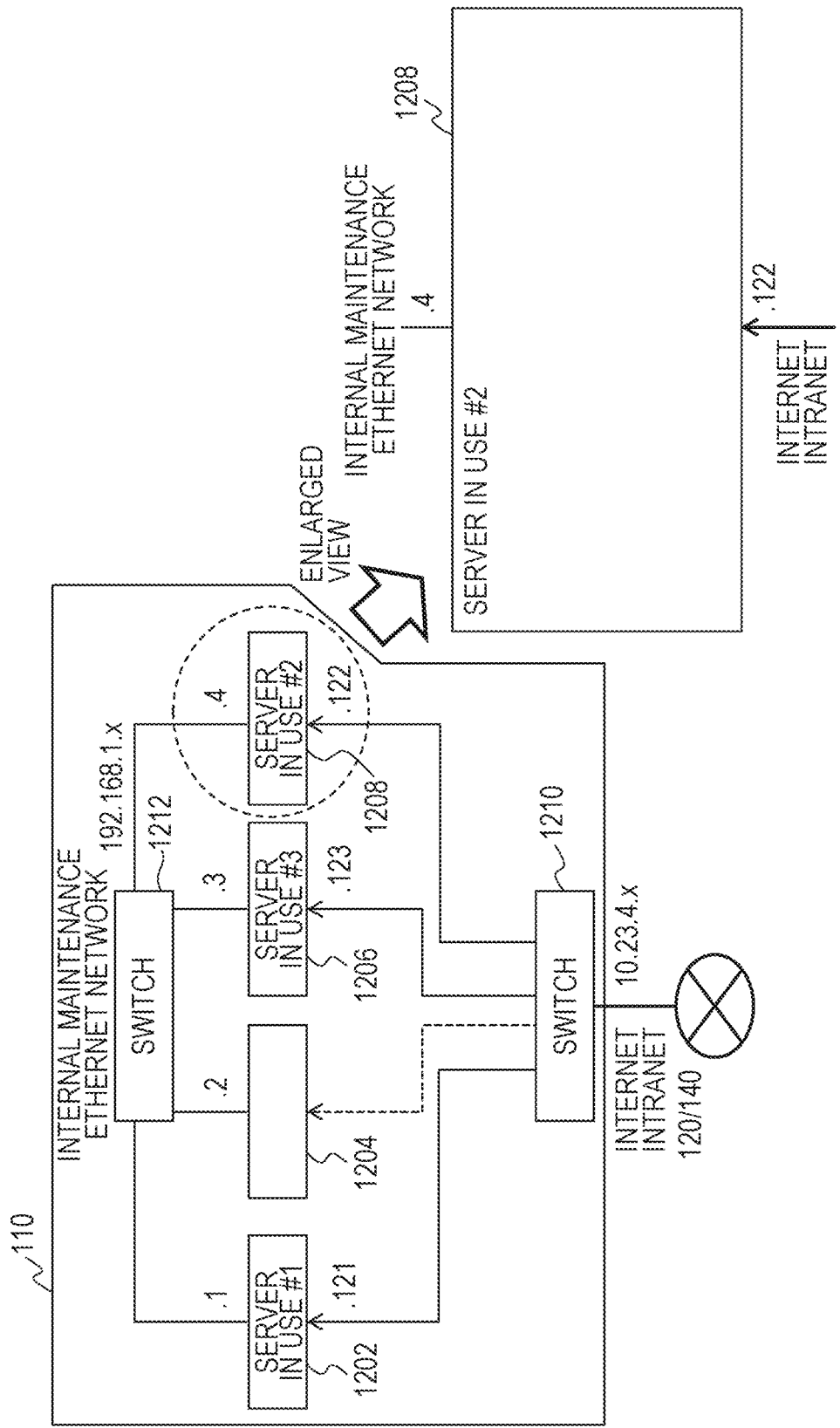
FIG. 21 is a diagram illustrating the entirety of the server system including the redundant configuration after transfer of a host OS.

FIGS. 17 and 18 are a flowchart and a sequence diagram, respectively, of the process for recovering from a failure executed by the server system 110. In the sequence diagram of FIG. 18, Standby server 4 indicates the server including the host OS 230.

In S100, the servers in use 1202, 1204, and 1206 synchronize data with the guest OSs 242, 244, and 246, respectively, on the standby server 1208 or the virtual servers 1214, 1216, and 1218, respectively, operated by the guest OSs 242, 244, and 246, respectively.

In S102, suppose that a failure occurs in the server in use 1204. The failure is detected in S104 or S106. More specifically, in S104, the control server 300 detects the failure in the server in use 1204. In S106, the standby virtual server 1216, which corresponds to the server in use 1204, detects the failure in the server in use 1204.

Next, in S108, the standby virtual server 1216, which corresponds to the server in use 1204, begins to operate as a virtual server in use. The system at this time is illustrated in a system diagram of FIG. 19 and a block diagram of FIG. 20.

In S110 that follows S108, the operation is switched from the standby virtual server 1216 to the standby server 1208, and the standby server 1208, which is operated by the host OS 230, begins to operate as a new server in use. The system at this time is illustrated in a system diagram of FIG. 21. The switching from the standby virtual server 1216 to the standby server 1208 may be executed by the switching unit in the control server 300. However, since the switching of the operation is switching on the same physical server, the switching may be executed by the movement unit (a second switching unit) included in the virtualization unit separate from the switching unit (a first switching unit) included in the control server 300 instead.

The switching from the standby virtual server 1216 to the standby server 1208 may be executed by the above-described transfer unit.

In S112, the standby server 1208 shuts down the virtual servers 1214, 1216, and 1218 operating on the host OS 230. The shutdown of these virtual servers is executed by a shutdown unit included in the control server 300 or the virtualization unit.

Figure 22:
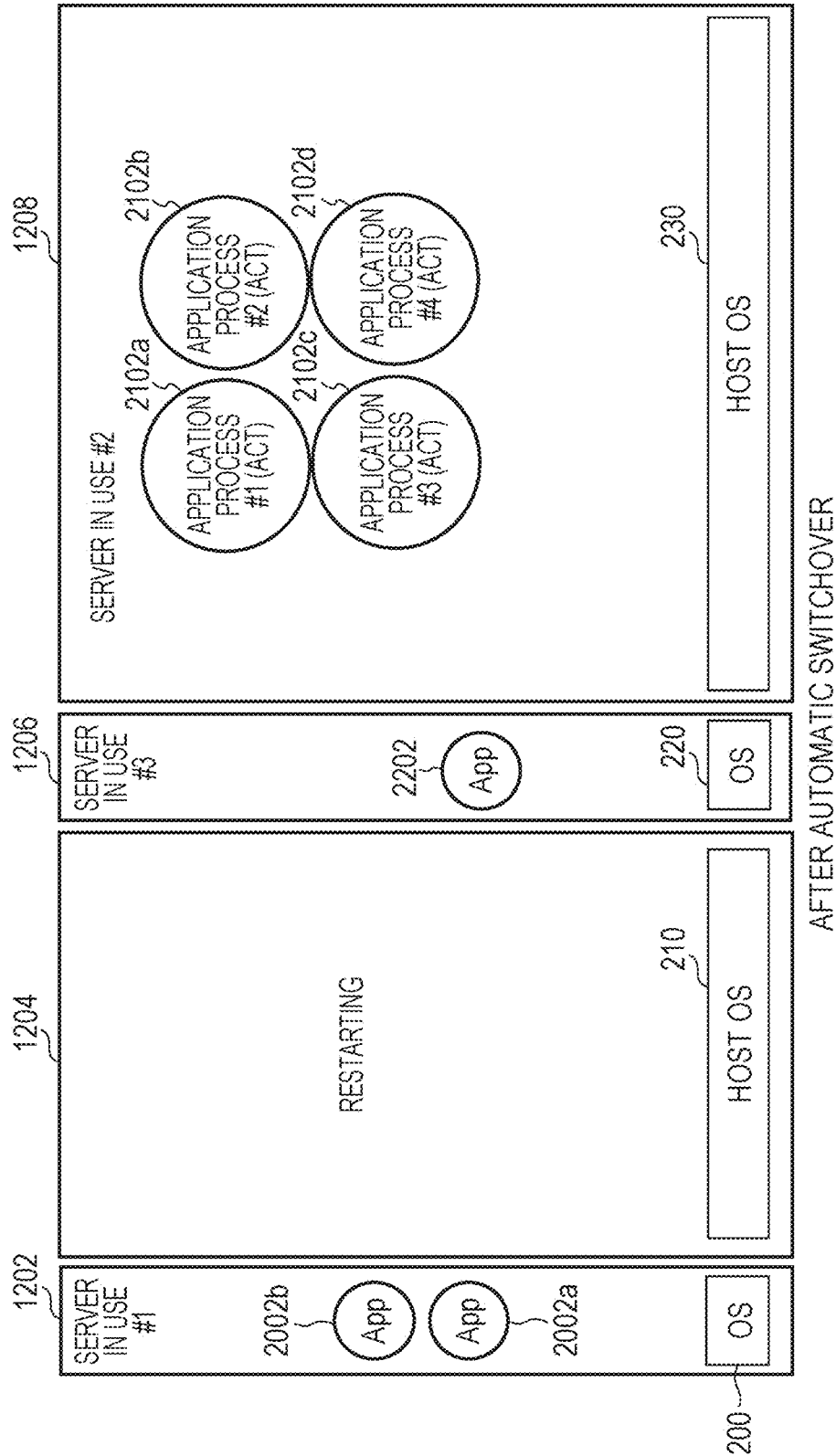
FIG. 22 is a block diagram illustrating the server system including the redundant configuration after the transfer of the host OS illustrated in FIG. 21.
Figure 23:
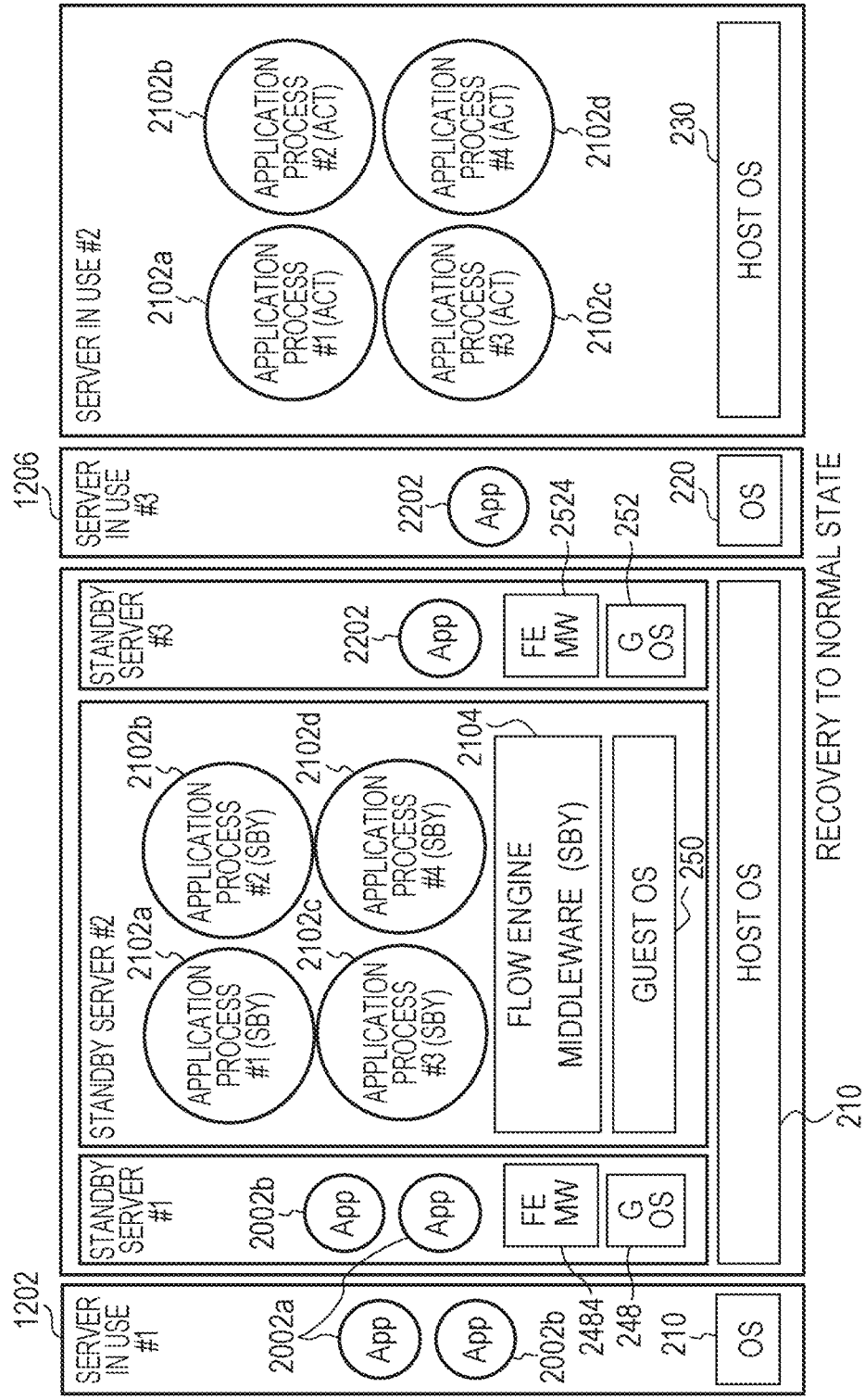
FIG. 23 is a block diagram illustrating the server system including the redundant configuration after recovery to normal operation.

Although not illustrated in FIGS. 17 and 18, the server 1204 may be restarted (FIG. 22) after S112, and a new standby server including the same configuration as the server 1208 before the failure may be constructed in the server 1204 using the virtualization mechanism (FIG. 23). FIG. 22 is a block diagram illustrating the server system including the N+1 redundant configuration according to this embodiment after the transfer of the host OS illustrated in FIG. 21. FIG. 23 is a block diagram illustrating the server system according to this embodiment after recovery to the normal operation. The block diagram of FIG. 23 is the same as that before the occurrence of the failure.

The timing of the switching of the operation from the standby virtual server 1216 to the standby server 1208 may be determined by the first or the second switching unit. For example, the switching of the operation from the standby virtual server 1216 to the standby server 1208 may be executed only when the processing speed of the standby virtual server 1216 has been judged to be insufficient on the basis of data regarding the operation states of the servers obtained by the control server 300, that is, the servers 1202 and 1206 and the standby virtual server 1216 in this case. For example, the operation may be switched on the basis of the operation rate of the CPU of the server 1208. Alternatively, the switching may be executed when it has been judged, on the basis of the data regarding the operation state of the standby virtual server 1216, that the switching of the operation from the standby virtual server 1216 to the standby server 1208 does not affect the processing executed by the standby virtual server 1216. For example, the switching of the operation may be executed when the amount of traffic of the standby virtual server 1216 is small.

By adopting the above configuration and by synchronizing data on a server in use and data on a corresponding standby server with each other in a server system in which an OS of the physical server in use operates on a virtual server on the standby physical server, a control server for controlling a reliable server system that has high availability and that can recover from a failure in a short period of time when the failure has occurred can be obtained, while suppressing cost without sacrificing the CPU performance and the I/O performance.

In addition, a reliable method for recovering from a failure can be obtained that has high availability, that can be executed by the control server, and that makes it possible to recover from a failure in a short period of time when the failure has occurred, while suppressing cost without sacrificing the CPU performance and the I/O performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A server, comprising:
  a monitoring unit that monitors operation states of one or more physical servers in use on which same applications operate while generating, deleting, or referring to data;
  a synchronization unit that synchronizes the data between one of the physical servers in use and one of virtual servers in a standby physical server, which includes the same number of the virtual servers as the physical servers in use, corresponding to the one of the physical servers in use; and
  a switching unit that, when the monitoring unit has detected that a failure has occurred in the operation of one of the physical servers in use, activates a first application of the same applications that has operated on the one of the physical servers in use on the one of the virtual servers corresponding to the one of the physical servers in use, that operates a second application of the same applications while referring to a piece of the data on the one of the virtual servers synchronized by the synchronization unit with the data on the one of the physical servers in use, and that switches operation from the one of the virtual servers to the standby physical server.

2. The server according to claim 1,
wherein the switching unit includes
a transfer unit that synchronizes data on one of the virtual servers included in the standby physical server with data on the standby physical server, and
a movement unit that activates the application on the standby physical server and that switches the operation from the one of the virtual servers to the standby physical server.

3. The server according to claim 1, further comprising:
a shutdown unit that shuts down at least one of the virtual servers.

4. The server according to claim 2, further comprising:
a shutdown unit that shuts down at least one of the virtual servers.

5. The server according to claim 1,
wherein the monitoring unit monitors an operation state of at least one of the virtual servers; and
wherein the switching unit begins to switch the operation from the one of the virtual servers to the standby physical server, based on the operation state of the one of the virtual servers.

6. The server according to claim 2,
wherein the monitoring unit monitors an operation state of at least one of the virtual servers; and
wherein the switching unit begins to switch the operation from the one of the virtual servers to the standby physical server, based on the operation state of the one of the virtual servers.

7. A server system, comprising:
one or more physical servers in use on which same applications operate while generating, deleting, or referring to data;
a standby physical server that includes a virtualization unit configured to provide virtual servers and the same number of the virtual servers as the physical servers in use provided by the virtualization unit; and
a control server that includes
a monitoring unit that monitors operation states of the physical servers in use,
a synchronization unit that synchronizes the data between one of the physical servers in use and the corresponding one of the virtual servers, and
a switching unit that, when the monitoring unit has found that a failure has occurred in the operation of one of the physical servers in use, activates a first application of the same applications that has operated on the one of the physical servers in use on the one of the virtual servers corresponding to the one of the physical servers in use, that operates a second application of the same applications while referring to a piece of the data on the one of the virtual servers synchronized by the synchronization unit with the data on the one of the physical servers in use, and that switches operation from the one of the virtual servers to the standby physical server.

8. The server system according to claim 7,
wherein the switching unit includes
a transfer unit that synchronizes data on one of the virtual servers included in the standby physical server with data on the standby physical server, and
a movement unit that activates the application on the standby physical server and that switches the operation from the one of the virtual servers to the standby physical server.

9. The server system according to claim 7,
wherein the control server includes a shutdown unit that shuts down at least one of the virtual servers.

10. The server system according to claim 8,
wherein the control server includes a shutdown unit that shuts down at least one of the virtual servers.

11. The server system according to claim 9,
wherein the control server includes a shutdown unit that shuts down at least one of the virtual servers.

12. The server system according to claim 7,
wherein the virtualization unit includes a shutdown unit that shuts down at least one of the virtual servers.

13. The server system according to claim 8,
wherein the virtualization unit includes a shutdown unit that shuts down at least one of the virtual servers.

14. The server system according to claim 9,
wherein the virtualization unit includes a shutdown unit that shuts down at least one of the virtual servers.

15. The server system according to claim 7,
wherein the monitoring unit monitors an operation state of at least one of the virtual servers; and
wherein the switching unit begins to switch the operation from the one of the virtual servers to the standby physical server, based on the basis of the operation state of the one of the virtual servers.

16. The server system according to claim 8,
wherein the monitoring unit monitors an operation state of at least one of the virtual servers; and
wherein the switching unit begins to switch the operation from the one of the virtual servers to the standby physical server, based on the operation state of the one of the virtual servers.

17. A method, by a processor, for controlling recovery from a failure, the method comprising:
monitoring, by the processor operation states of one or more physical servers in use on which same applications operate while generating, deleting, or referring to data;
synchronizing the data between one of the physical servers in use and one of virtual servers in a standby physical server, which includes the same number of the virtual servers as the physical servers in use, corresponding to the one of the physical servers in use; and
activating, when it has been found in the monitoring that a failure has occurred in the operation of one of the physical servers in use, a first application of the same applications that has operated on the one of the physical servers in use on the one of the virtual servers corresponding to the one of the physical servers in use, operating a second application of the same applications while referring to a piece of the data on the one of the virtual servers synchronized in the synchronizing with the data on the one of the physical servers in use, and switching operation from the one of the virtual servers to the standby physical server.

18. The method for controlling recovery from a failure according to claim 17,
wherein the switching includes
synchronizing data on one of the virtual servers included in the standby physical server with data on the standby physical server, and
activating the second application of the same applications on the standby physical server and switching the operation from the one of the virtual servers to the standby physical server.

19. The method for controlling recovery from a failure according to claim 17, further comprising:
shutting down at least one of the virtual servers.

20. The method for controlling recovery from a failure according to claim 17,
 wherein, in the monitoring, an operation state of at least one of the virtual servers is monitored; and
 wherein, in the switching, the operation is begun to switch from the one of the virtual servers to the standby physical server, based on the operation state of the one of the virtual servers.

\* \* \* \* \*